United States Patent
Park et al.

(10) Patent No.: US 10,743,362 B2
(45) Date of Patent: Aug. 11, 2020

(54) METHOD WHEREBY USER EQUIPMENT OPERATES IN WIRELESS COMMUNICATION SYSTEM, AND DEVICE FOR SUPPORTING SAME

(71) Applicant: LG Electronics Inc., Seoul (KR)

(72) Inventors: Hanjun Park, Seoul (KR); Hyunsoo Ko, Seoul (KR); Eunsun Kim, Seoul (KR); Kijun Kim, Seoul (KR); Changhwan Park, Seoul (KR); Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/337,030

(22) PCT Filed: Sep. 27, 2017

(86) PCT No.: PCT/KR2017/010717
§ 371 (c)(1),
(2) Date: Mar. 27, 2019

(87) PCT Pub. No.: WO2018/062845
PCT Pub. Date: Apr. 5, 2018

(65) Prior Publication Data
US 2020/0037385 A1 Jan. 30, 2020

Related U.S. Application Data

(60) Provisional application No. 62/442,939, filed on Jan. 5, 2017, provisional application No. 62/441,432, filed
(Continued)

(51) Int. Cl.
H04W 76/18 (2018.01)
H04W 24/10 (2009.01)
(Continued)

(52) U.S. Cl.
CPC .......... *H04W 76/18* (2018.02); *H04B 7/0695* (2013.01); *H04W 16/28* (2013.01);
(Continued)

(58) Field of Classification Search
CPC ..... H04W 76/18; H04W 76/19; H04W 76/27; H04W 24/02; H04W 24/04; H04W 24/10;
(Continued)

(56) References Cited

U.S. PATENT DOCUMENTS

2014/0269368 A1  9/2014  Xu et al.
2015/0124688 A1  5/2015  Xu et al.
(Continued)

FOREIGN PATENT DOCUMENTS

EP  3424152  1/2019
EP  3500051  6/2019
(Continued)

OTHER PUBLICATIONS

PCT International Search Report and Written Opinion in International Application No. PCT/KR2017/010717, dated Jan. 23, 2018, 15 pages (with English translation).
(Continued)

*Primary Examiner* — Candal Elpenord
(74) *Attorney, Agent, or Firm* — Fish & Richardson P.C.

(57) ABSTRACT

Disclosed are a method whereby user equipment operates in a wireless communication system, and a device for supporting same. Disclosed more particularly are: a method whereby, in case a base station which operates multiple analogue beams is connected to user equipment, the user equipment determines a cell-level radio link failure (RLF) and a beam-level RLF through signal transmission and reception to and from the base station and carries out an operation based on the determination; and a device for supporting said method.

13 Claims, 21 Drawing Sheets

Related U.S. Application Data on Jan. 1, 2017, provisional application No. 62/423,782, filed on Nov. 18, 2016, provisional application No. 62/421,191, filed on Nov. 11, 2016, provisional application No. 62/418,746, filed on Nov. 7, 2016, provisional application No. 62/417,278, filed on Nov. 3, 2016, provisional application No. 62/408,535, filed on Oct. 14, 2016, provisional application No. 62/405,850, filed on Oct. 7, 2016, provisional application No. 62/404,773, filed on Oct. 6, 2016, provisional application No. 62/400,598, filed on Sep. 27, 2016.

(51) Int. Cl.

| | | |
|---|---|---|
| *H04B 7/06* | (2006.01) | |
| *H04W 76/27* | (2018.01) | |
| *H04W 72/04* | (2009.01) | |
| *H04W 76/19* | (2018.01) | |
| *H04W 56/00* | (2009.01) | |
| *H04W 16/28* | (2009.01) | |

(52) U.S. Cl.
CPC ......... *H04W 24/10* (2013.01); *H04W 56/001* (2013.01); *H04W 72/046* (2013.01); *H04W 76/19* (2018.02); *H04W 76/27* (2018.02)

(58) Field of Classification Search
CPC ... H04W 16/28; H04W 56/001; H04W 72/02; H04W 72/04; H04W 72/046; H04B 7/0695

See application file for complete search history.

(56) References Cited

U.S. PATENT DOCUMENTS

| | | | |
|---|---|---|---|
| 2016/0142922 A1 | 5/2016 | Chen et al. | |
| 2016/0183233 A1* | 6/2016 | Park | H04W 16/30 |
| 2017/0373731 A1* | 12/2017 | Guo | H04L 5/0051 |
| 2019/0081688 A1* | 3/2019 | Deenoo | H04B 7/0695 |
| 2019/0335522 A1* | 10/2019 | Zhang | H04W 74/0833 |
| 2020/0052765 A1* | 2/2020 | Islam | H04B 7/0621 |

FOREIGN PATENT DOCUMENTS

| | | |
|---|---|---|
| KR | 1020110086523 | 7/2011 |
| WO | WO2015109153 | 7/2015 |
| WO | WO2017151876 | 9/2017 |

OTHER PUBLICATIONS

Samsung, "Radio Link Failure detection in High Frequency NR systems," R2-165203, 3GPP TSG-RAN WG2 Meeting #95, Göthenborg, Sweden, Aug. 22-26, 2016, 3 pages.

Extended European Search Report in European Application No. 17856731.9, dated Apr. 30, 2020, 6 pages.

* cited by examiner

METHOD WHEREBY USER EQUIPMENT OPERATES IN WIRELESS COMMUNICATION SYSTEM, AND DEVICE FOR SUPPORTING SAME

CROSS-REFERENCE TO RELATED APPLICATIONS

This application is a National Stage application under 35 U.S.C. § 371 of International Application No. PCT/KR2017/010717, filed on Sep. 27, 2017, which claims the benefit of U.S. Provisional Application No. 62/442,939, filed on Jan. 5, 2017, U.S. Provisional Application No. 62/441,432, filed on Jan. 1, 2017, U.S. Provisional Application No. 62/423,782, filed on Nov. 18, 2016, U.S. Provisional Application No. 62/421,191, filed on Nov. 11, 2016, U.S. Provisional Application No. 62/418,746, filed on Nov. 7, 2016, U.S. Provisional Application No. 62/417,278, filed on Nov. 3, 2016, U.S. Provisional Application No. 62/408,535, filed on Oct. 14, 2016, U.S. Provisional Application No. 62/405,850, filed on Oct. 7, 2016, U.S. Provisional Application No. 62/404,773, filed on Oct. 6, 2016, and U.S. Provisional Application No. 62/400,598, filed on Sep. 27, 2016. The disclosures of the prior applications are incorporated by reference in their entirety.

TECHNICAL FIELD

The following description relates to a wireless communication system and, particularly to an operation method of a user equipment in a wireless communication system and an apparatus supporting the same.

More specifically, the following description relates to a method in which, when a base station which operates a plurality of analog beams is connected to a user equipment, the user equipment determines cell-level radio link failure (RLF) and beam-level RLF through signal transmission and reception to and from the base station and performs an operation based on the determined result, and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DETAILED DESCRIPTION OF THE INVENTION

Technical Problems

An object of the present invention is to provide an operation method of a user equipment in a newly proposed communication system.

Particularly, an object of the present invention is to provide an operation method of a user equipment and an apparatus therefor, wherein the user equipment determines cell-level RLF and beam-level RLF using signals received from a base station and performs an operation based on the determined result, when the base station operates a plurality of analog beams in a newly proposed communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides an operation method of a user equipment and a UE performing the operation method in a wireless communication system. Particularly, the present invention proposes an operation method of the user equipment and the user equipment performing the operation method when a base station connected to the UE operates a plurality of analog beams.

According to an aspect of the present invention, provided herein is an operation method of a user equipment (UE) connected to a base station (BS) which operates a plurality of analog beams in a wireless communication system, including receiving a cell-specific signal and a beam-specific signal, which corresponds to a serving beam of the BS, from the BS; determining cell-level radio link failure (RLF) and beam-level RLF, based on a result of receiving the cell-specific signal and the beam-specific signal; and performing a corresponding operation according to a result of determining the cell-level RLF and the beam-level RLF.

In another aspect of the present invention, provided herein is a user equipment (UE) connected to a base station (BS) which operates a plurality of analog beams in a wireless communication system, including a transmitter; a receiver; and a processor connected to the transmitter and the receiver, wherein the processor is configured to receive a cell-specific signal and a beam-specific signal, which corresponds to a serving beam of the BS, from the BS; determine cell-level radio link failure (RLF) and beam-level RLF, based on a result of receiving the cell-specific signal and the beam-specific signal; and perform a corresponding operation according to a result of determining the cell-level RLF and the beam-level RLF.

Upon determining that the cell-level RLF has occurred, the UE may perform a radio resource control (RRC) connection re-establishment procedure.

If the RRC connection re-establishment procedure is successful, the UE may maintain RRC connection with the eNB and, if the RRC connection re-establishment procedure fails, the UE may transition to an RRC-idle mode and perform a cell selection or cell reselection procedure.

Upon determining that the cell-level RLF has not occurred and the beam-level RLF has occurred, the UE may perform a serving beam re-establishment procedure.

If the serving beam re-establishment procedure is successful, the UE may maintain RRC connection with the BS using the serving beam and, if the serving beam re-establishment procedure fails, the UE may initialize the serving beam and perform a beam recovery procedure for the BS.

The beam recovery procedure for the BS may include transmitting information about a best beam preferred with respect to the BS or information about a channel of each beam to the BS; receiving configuration information regarding a new serving beam from the BS based on the information transmitted to the BS; and updating the serving beam for the UE using the configuration information regarding the new serving beam.

Upon determining that the cell-level RLF has not occurred and the beam-level RLF has not occurred, the UE may maintain the serving beam for the BS until a serving beam release indication is received and maintain radio resource control (RRC) connection with the BS until an RRC connection release indication is received.

In the present invention, the cell-specific signal may include one or more of a synchronization signal, a demodulation reference signal (DM-RS) for a physical broadcast channel (PBCH), and a signal which corresponds to the BS and is transmitted by applying a beam sweeping operation to the plural analog beams.

In the present invention, the beam-specific signal may include one or more of a reference signal for measuring channel state information corresponding to the serving beam and a signal having a quasi co-location (QCL) relationship with the serving beam.

In the present invention, the cell-level RLF may be determined based on received strength of the cell-specific signal.

The UE may calculate an average value of higher N (where N is a natural number) measurement values for the cell-specific signal in each time interval and determining the cell-level RLF based on a value obtained by applying time-axis filtering to the average value in each time interval.

The beam-level RLF may be determined based on received strength of the beam-specific signal.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to a newly proposed wireless communication system (e.g., NR system), one base station can transmit and receive signals while delaying a plurality of analog beams.

To provide a smooth service between the base station and a specific user equipment, not only a link state between the specific user equipment and the base station but also a link state for a serving beam of the base station from which the specific user equipment receives a service should be considered.

Accordingly, according to the present invention, the specific UE can determine cell-level RLF and beam-level RLF applicable to a newly proposed wireless communication system and perform a more detailed operation according to the determined result.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR CARRYING OUT THE INVENTION

Figure 1:
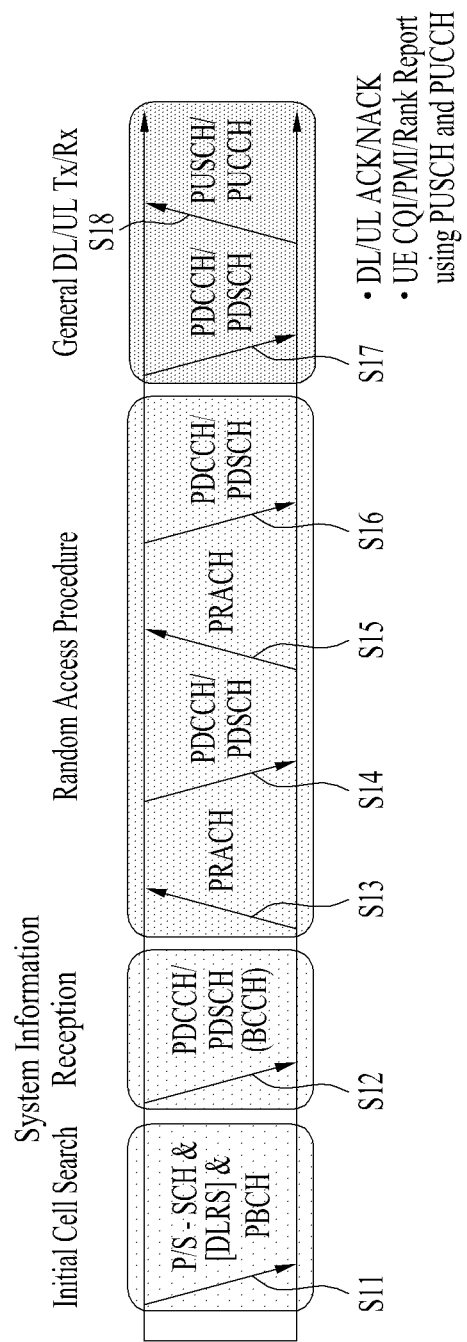
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided least it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A SYSTEM 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
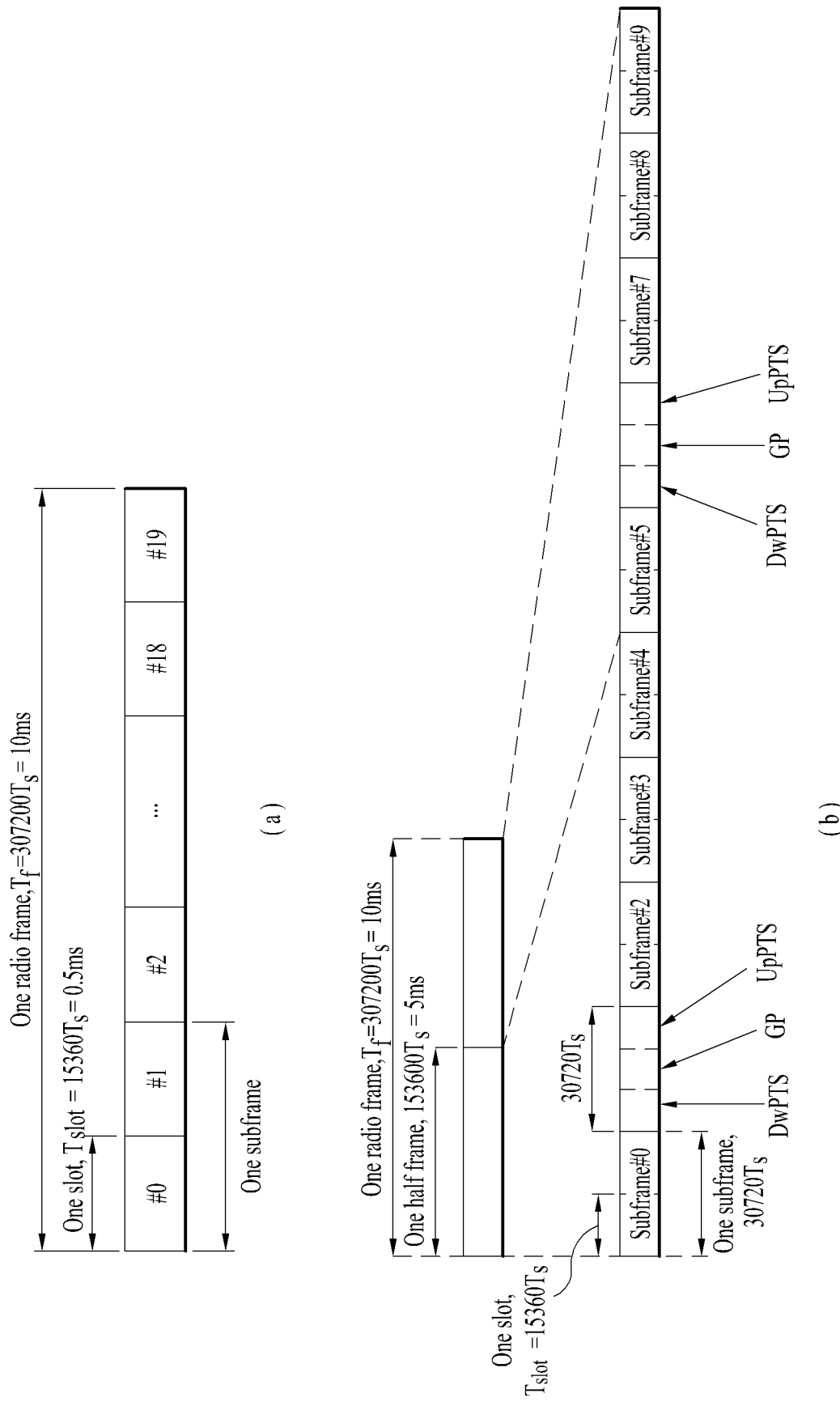
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
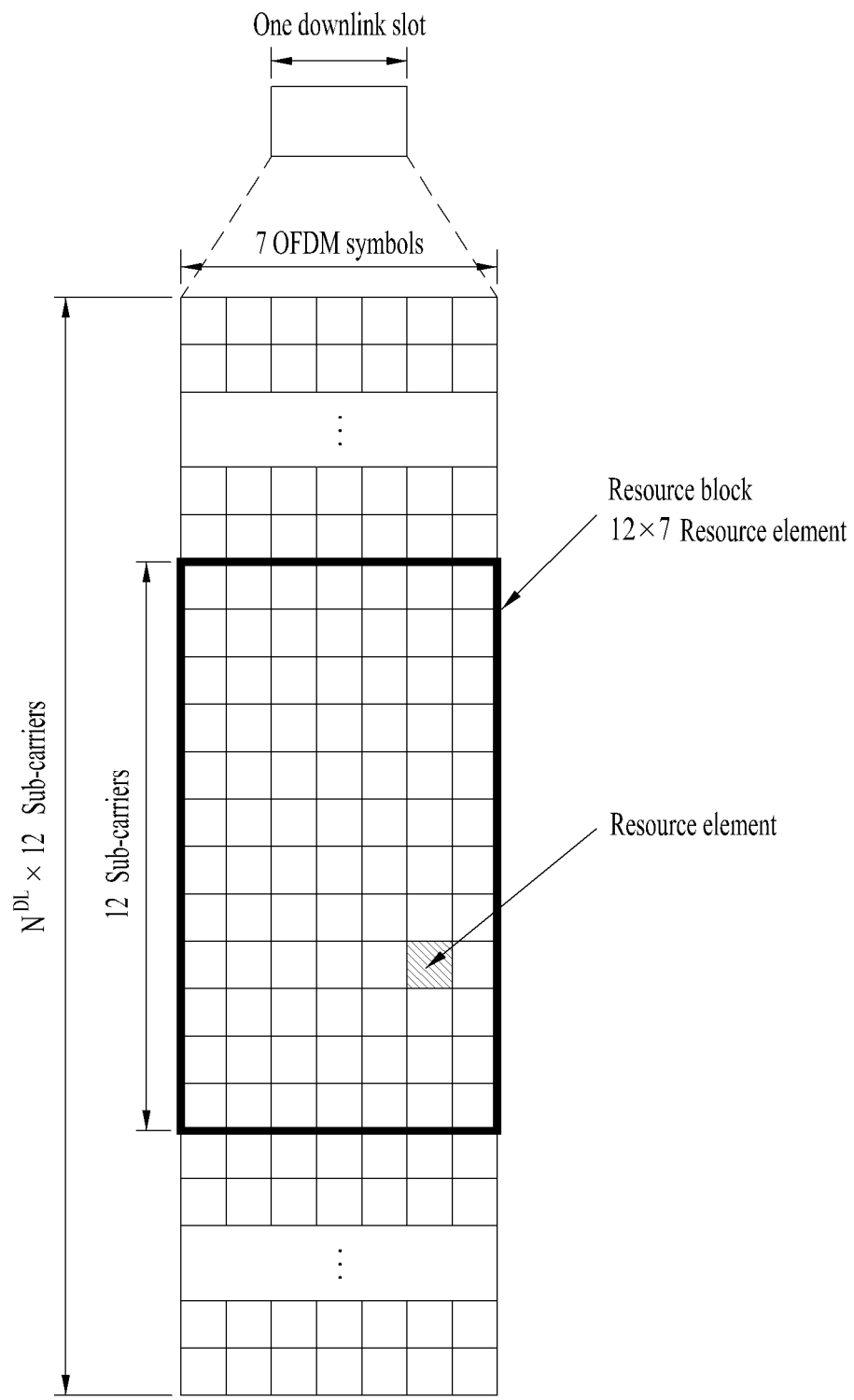
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
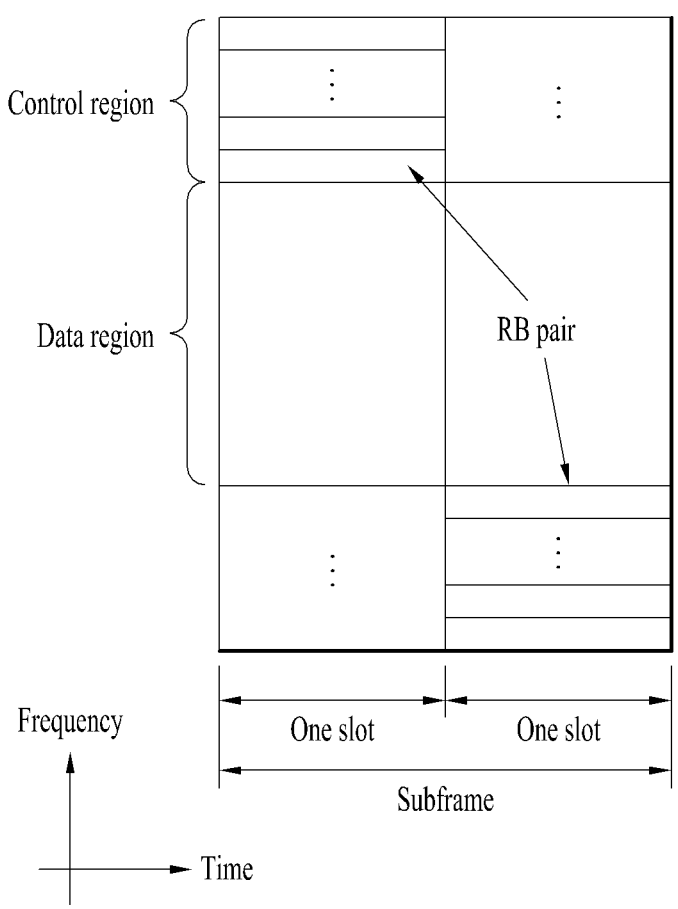
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
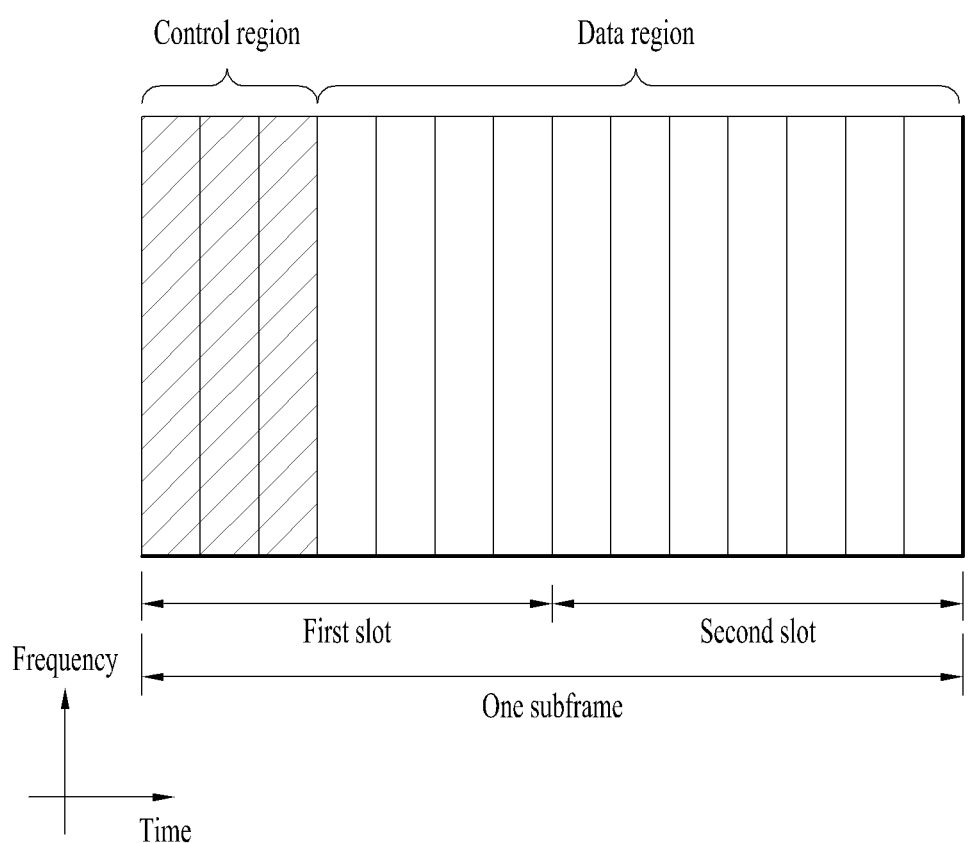
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIB5. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. NEW RADIO ACCESS TECHNOLOGY SYSTEM

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 6:
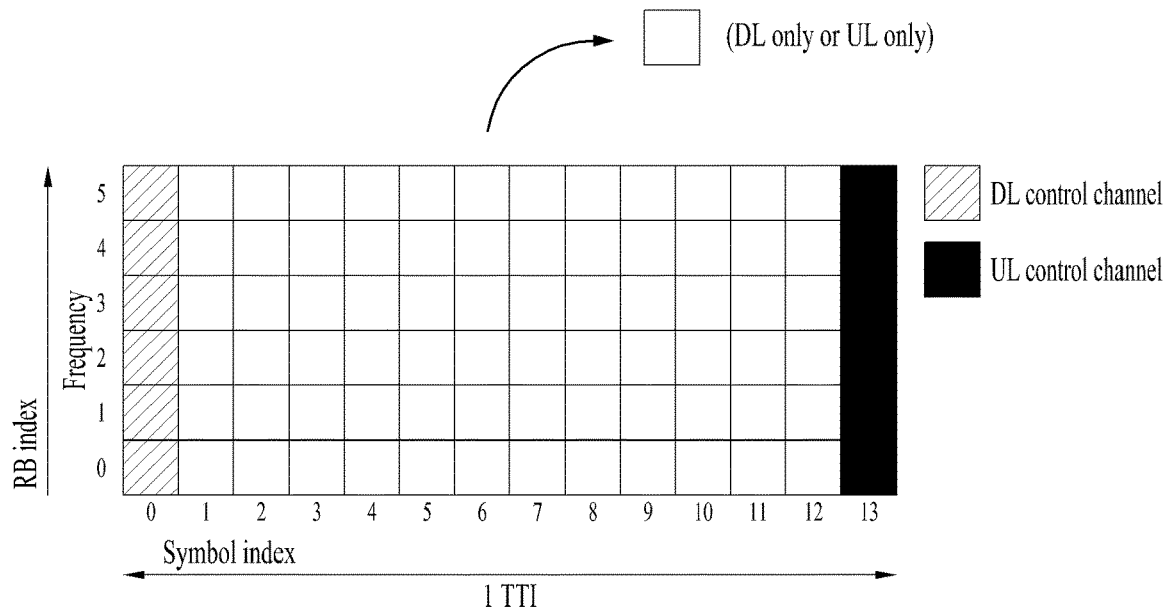
FIG. 6 is a diagram illustrating a self-contained subframe structure applicable to the present invention.

FIG. 6 is a diagram illustrating a self-contained subframe structure applicable to the present invention.

In the NR system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 6.

subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. The NR system uses the OFDM transmission scheme or a similar transmission scheme. The NR system typically includes an OFDM numerology as shown in Table 2. For convenience of description, a configuration of Table 2 will be referred to as a numerology.

TABLE 2

| Parameter | Value |
|---|---|
| Subcarrier-spacing (Δf) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available 2.3. Analog Beamforming In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
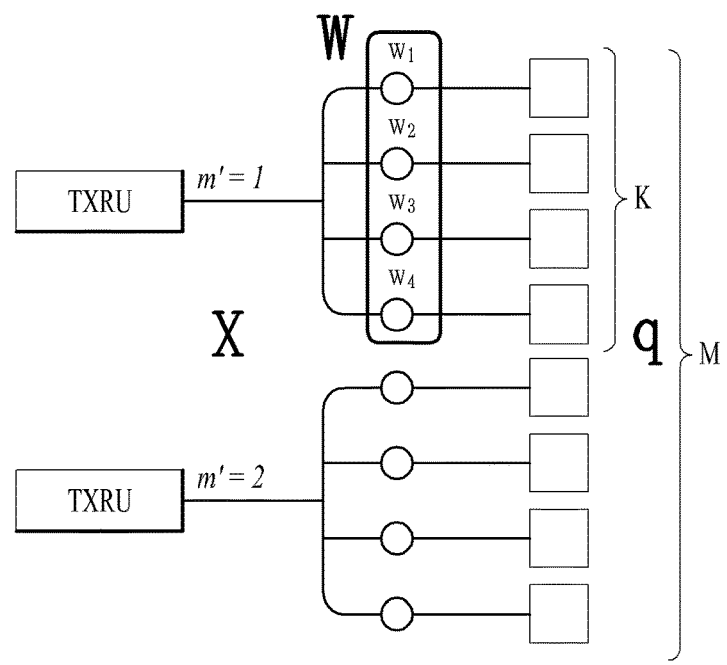
FIGS. 7 and 8 are diagrams illustrating representative methods for connecting TXRUs to antenna elements.
Figure 8:
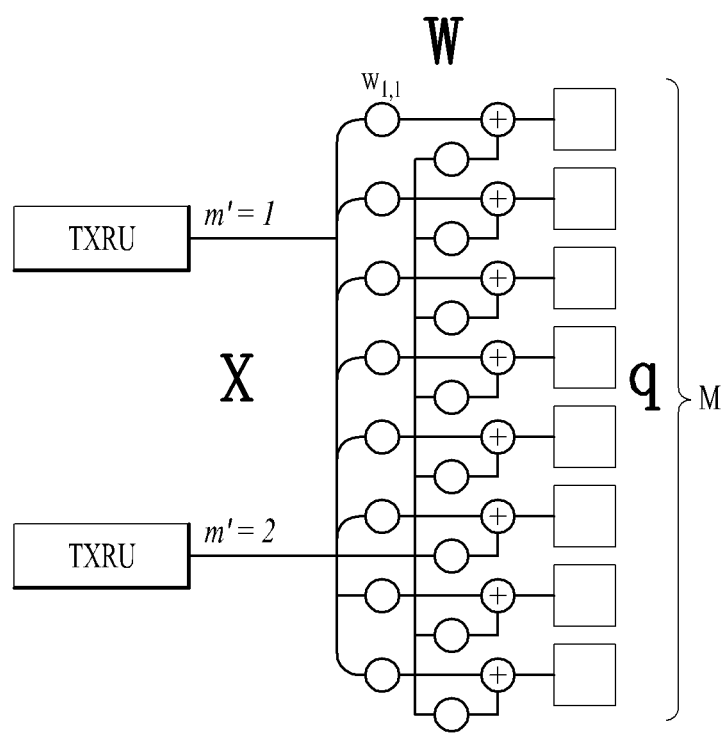

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas is used in the NR system to which the present invention is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 9:
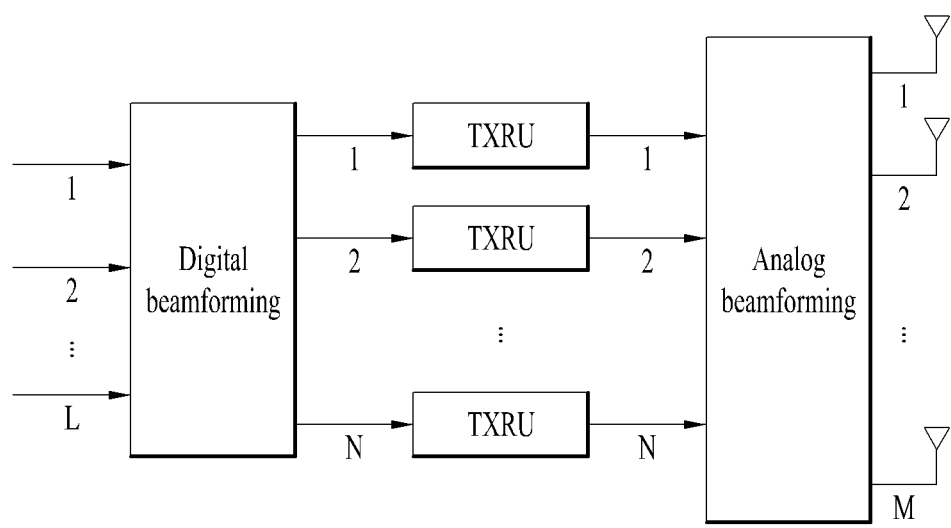
FIG. 9 is a diagram schematically illustrating an exemplary hybrid beamforming structure from the perspective of transceiver units (TXRUs) and physical antennas according to the present invention.

FIG. 9 is a diagram schematically illustrating an exemplary hybrid BF structure from the perspective of TXRUs and physical antennas according to the present invention. In FIG. 9, the number of digital beams is L and the number analog beams is N.

Additionally, in the NR system to which the present invention is applicable, an eNB designs analog BF to be changed in units of symbols to provide more efficient BF support to a UE located in a specific area. Furthermore, as illustrated in FIG. 9, when N specific TXRUs and M RF antennas are defined as one antenna panel, the NR system according to the present invention considers introducing a plurality of antenna panels to which independent hybrid BF is applicable.

In the case in which the eNB utilizes a plurality of analog beams as described above, the analog beams advantageous for signal reception may differ according to a UE. Therefore, in the NR system to which the present invention is applicable, a beam sweeping operation is being considered in which the eNB transmits signals (at least synchronization signals, system information, paging, and the like) by applying different analog beams in a specific subframe (SF) on a symbol-by-symbol basis so that all UEs may have reception opportunities.

Figure 10:
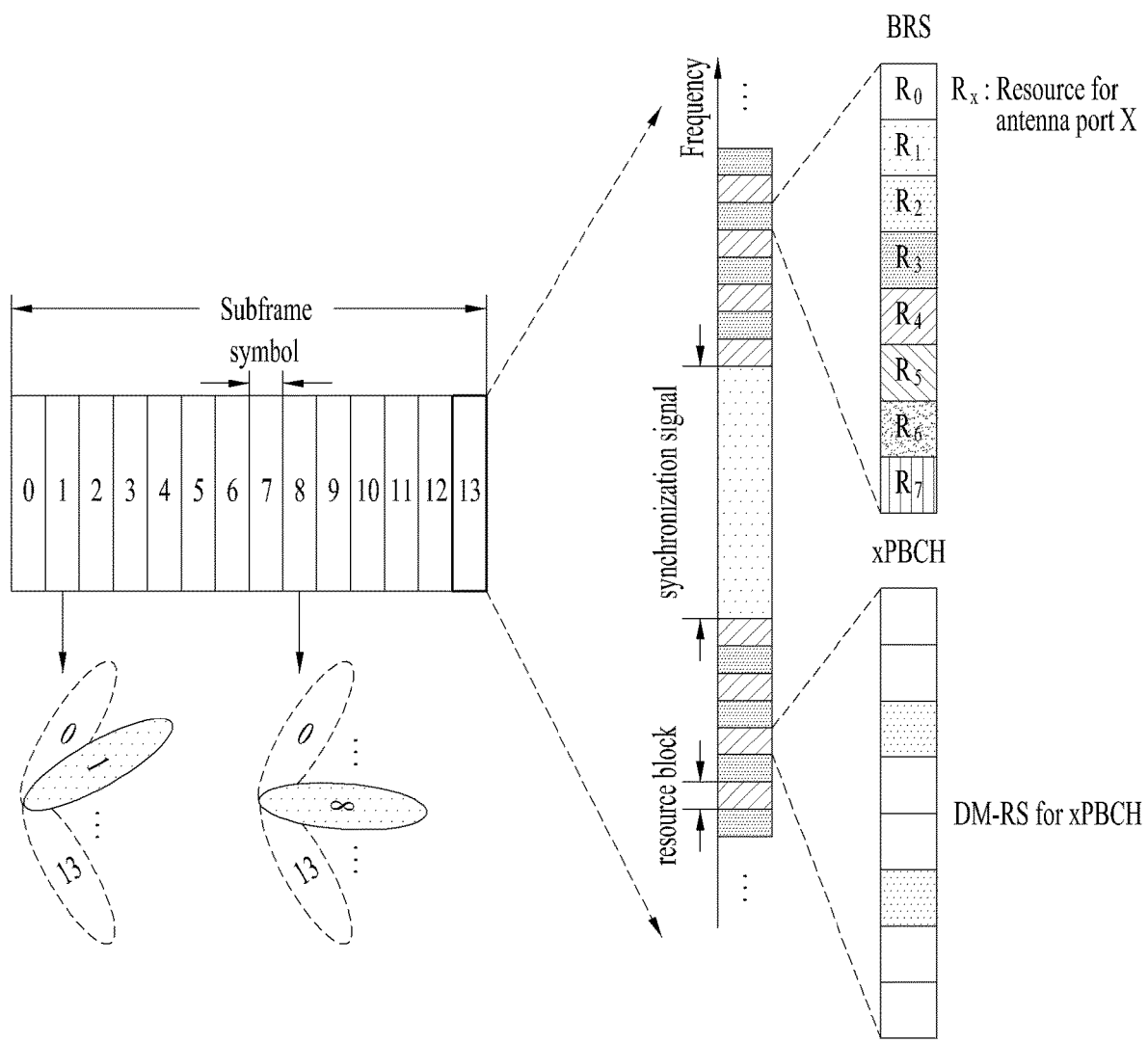
FIG. 10 is a diagram schematically illustrating an exemplary beam sweeping operation for a synchronization signal and system information in a downlink (DL) transmission procedure according to the present invention.

FIG. 10 is a diagram schematically illustrating an exemplary beam sweeping operation for a synchronization signal and system information in a DL transmission procedure according to the present invention.

In FIG. 10 below, a physical resource (or physical channel) on which the system information of the NR system to which the present invention is applicable is transmitted in a broadcasting manner is referred to as an xPBCH. Here, analog beams belonging to different antenna panels within one symbol may be simultaneously transmitted.

As illustrated in FIG. 10, in order to measure a channel for each analog beam in the NR system to which the present invention is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

3. PROPOSED EMBODIMENTS

Hereinafter, configurations proposed in the present invention based on the above technical description will be described in detail.

In the NR system to which the present invention is applicable, introducing a network slicing scheme is considered to achieve a plurality of logical networks over a single physical network. The logical networks should be capable of supporting services having various requirements (e.g., enhanced mobile broadband (eMBB), massive machine type communication (mMTC), ultra-reliable low-latency communication (URLLC), etc.).

In addition, a physical layer system of the NR system to which the present invention is applicable considers a method of supporting OFDM to which a variable numerology is applicable according to various services. Herein, the variable numerology may imply that the length of an OFDM symbol, a subcarrier spacing, and the like are variably configured. In other words, the NR system to which the present invention is applicable may consider an OFDM scheme (or a multiple access scheme) having a different numerology in each time and frequency resource region.

As described earlier, as data traffic abruptly increases with appearance of smart devices, the NR system to which the present invention is applicable is needed to support higher communication capacity (e.g., data throughput). One method considered to raise communication capacity is to transmit data using a plurality of transmission (or reception) antennas in the NR system to which the present invention is applicable. If digital BF is applied to the plural antennas, each antenna requires an RF chain (e.g., a chain consisting of RF elements such as a power amplifier and a down converter) and a D/A or A/D converter. This structure, however, increases hardware complexity and consumes high power which may not be practical. Accordingly, the NR system to which the present invention is applicable considers a hybrid BF scheme in which digital BF and analog BF are combined to utilize the plurality of antennas.

In the NR system to which the present invention is applicable, a method in which a plurality of transmission and reception points (TRPs) configures one cell is under discussion unlike a wireless communication system such as a legacy LTE system in which one eNB forms one cell. If the plural TRPs configure one cell, a seamless communication service may be provided even when a TRP that provides a service to a UE is changed so that mobility management of the UE is facilitated.

Figure 11:
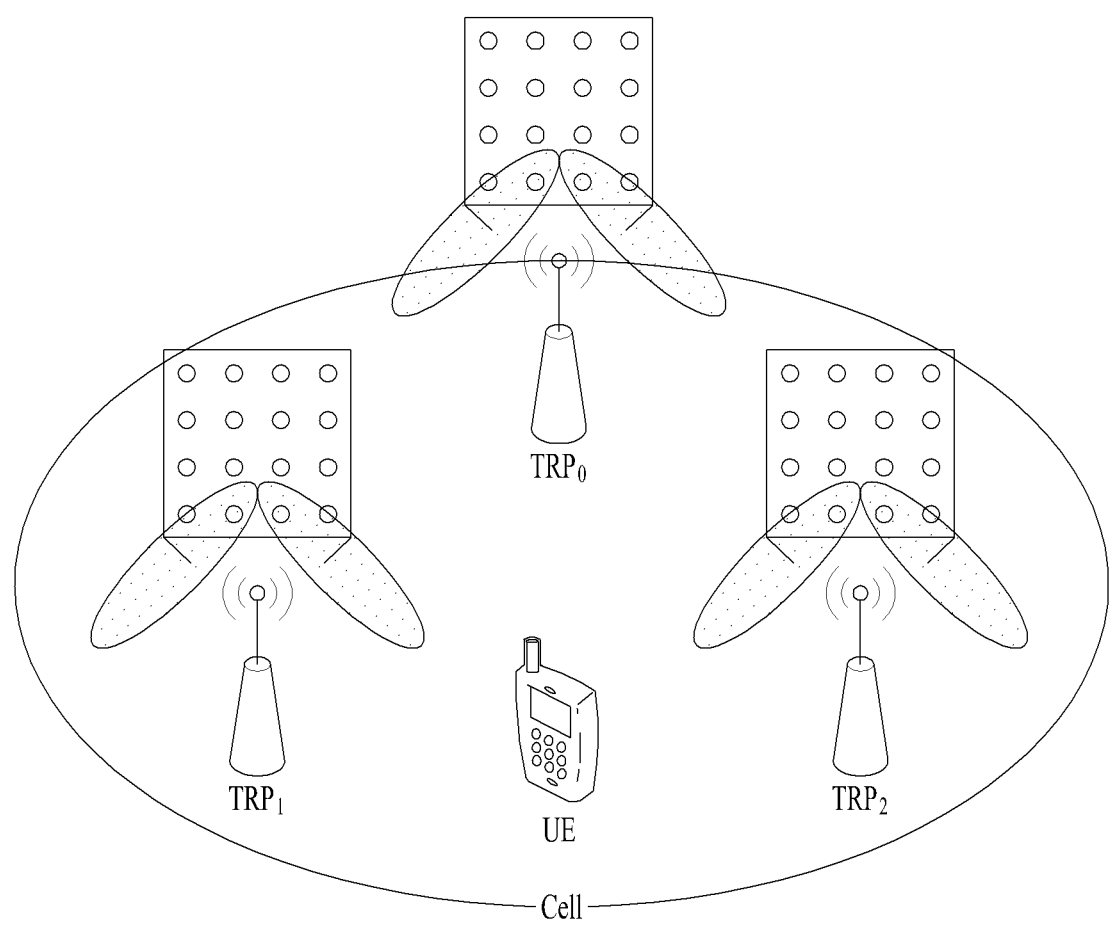
FIG. 11 is a diagram illustrating an exemplary single cell including three TRPs (e.g., $TRP_0$, $TRP_1$, and $TRP_2$) according to the present invention.

FIG. 11 is a diagram illustrating an exemplary single cell including three TRPs (e.g., $TRP_0$, $TRP_1$, and $TRP_2$) according to the present invention.

As illustrated in FIG. 11, mutual data transmission and reception may be performed between the TRPs constituting a single cell through a backhaul network having very low latency and boundaries of subframes (SFs) or transmission time intervals (TTIs) between the TRPs may be equal.

Each TRP may transmit a signal in a plurality of beam directions according to a hybrid BF (or analog BF) scheme. In this case, only an analog beam in a specific direction at a specific timing may be applied to a single TXRU of each TRP. If it is desired to transmit a signal in a plurality of analog beam directions using a single TXRU, the single TXRU should transmit the signal by changing an analog beam direction on each time resource of a plurality of distinguishable time resources. As described above, an operation in which the TXRU changes an analog beam direction for each TXRU on a plurality of time resources may be referred to as a beam sweeping operation.

A UE may select a cell, from which a service is to be provided to the UE, based on link quality with the cell and link quality of a specific cell may be estimated by measuring received strength of a specific DL signal transmitted by the cell or received strength of a specific UL signal transmitted by the UE.

Hereinafter, in the present invention, an operation of measuring link quality of the specific cell using a DL signal will be referred to as DL measurement (for cell selection) for convenience of description.

For example, in an LTE system, the eNB may transmit a cell-specific reference signal (CRS) and the UE may measure average received power (e.g., RSRP) of the CRS and use the measurement result as a cell selection reference.

However, in the NR system to which the present invention is applicable, a plurality of TRPs may be present in a single cell as illustrated in FIG. 11 and each TRP may support a plurality of analog beam directions according to the hybrid BF (or analog BF) scheme. Therefore, a scheme in which the eNB transmits a DL signal for DL measurement (for cell selection) and a value to be measured for DL measurement (for cell selection) using the DL signal should be defined.

Furthermore, how link quality for a specific TRP/beam is to be measured (e.g., whether a DL signal is used or a UL signal is used) should be defined to determine a TRP/beam favorable to receive a service in a cell even after the UE selects the cell.

Hereinafter, for convenience of description, the above-described measurement operation is referred to as DL measurement (for selecting the TRP/beam) and UL measurement. The present invention describes in detail a DL measurement method (for cell selection), a DL measurement method (for selecting the TRP/beam), and a UL measurement method, when a single cell includes a plurality of TRPs and each TRP is capable of performing signal transmission in a plurality of analog beam directions according to a hybrid BF (or analog BF) scheme.

Hereinbelow, in the present invention, the eNB means a network entity for managing operation of TRP(s) in a single cell and it will be assumed that one eNB is present in one cell.

Hereinafter, in the present invention, a signal which is a DL signal for DL measurement (for cell selection) and is distinguishable from a synchronization signal will be referred to as a measurement reference signal (MRS). Alternatively, the MRS may be replaced with the synchronization signal. In this case, the synchronization signal may be designed to be transmitted based on a plurality of antenna ports.

Hereinafter, in the present invention, a cell-specific DL signal (e.g., a cell-specific DL signal, a cell-specific DL RS, a cell-specific measurement RS, a cell-specific MRS (C-MRS)) may be an RS for which an RS resource (e.g., a sequence and/or an antenna port) is defined for each cell in a time unit in which the same (analog) beam is maintained. In this case, a different (analog) beam may be applied to a different time unit, so that multi-beam transmission may be supported for the cell-specific DL signal.

A beam-specific DL signal (e.g., a beam-specific DL signal, a beam-specific DL RS, a beam-specific measurement RS, or a beam-specific MRS (B-MRS)) may be an RS for which an RS resource (e.g., a sequence and/or an antenna port) is defined for each of a plurality of analog beams in a time unit in which the same (analog) beam is maintained.

3.1. DL Measurement Method

3.1.1. First DL Measurement Method

The eNB may transmit a synchronization signal to which a beam sweeping operation is applied in N symbols (or time units) in a periodically repeated time interval and then the UE may perform DL measurement (for cell selection) using one of the following methods.

(1) The UE may measure a maximum value among received power values of synchronization signals in respective symbols in every time interval and then use a time-axis average value (or a value to which time-axis filtering is applied) of the measured values as a DL measurement value.

(2) The UE may measure received power values of synchronization signals in respective symbols in every time interval, acquire a time-axis average value X (or a value to which time-axis filtering is applied) of the measured values on a symbol-by-symbol basis, and then use a maximum value (or K large values) among the average values X for respective symbols as the DL measurement value.

Thus, the UE may measure a maximum value among the received power values of the synchronization signals in respective symbols (or time units) in every time interval and then use a time-axis average value of the measured values as the DL measurement value (for cell selection).

The beam sweeping operation of the eNB may represent an operation of changing an analog beam direction (of each TXRU) with respect to a plurality of symbols (or time resources).

The UE may assume that N is No, wherein No is a preset value.

In the above description, the "time-axis average value (or value to which time-axis filtering is applied) of the measured values on a symbol-by-symbol basis" may mean a time-axis average value (or a value to which time-axis filtering is applied) of values measured in the same symbol index.

Additionally, the "symbol" of the above-described first DL measurement method may be replaced with "time unit corresponding to a beam sweeping unit" or "time unit in which beams can be distinguished from the perspective of reception". For example, in an NR system to which the present invention is applicable, a synchronization block, which is a resource unit including a synchronization signal, a PBCH, and/or an MRS, is defined. When the eNB transmits a signal by applying the beam sweeping operation to the synchronization block, the above-described "symbol" may be replaced with "synchronization block".

More specifically, in order to demodulate DL data transmitted by a specific eNB, the UE should be capable of discerning the boundary of a transmission unit (e.g., a symbol) in which the eNB performs transmission. As an example, in an OFDM system to which a cyclic prefix (CP) is applied, a duration in which the UE performs fast Fourier transform (FFT) in an OFDM symbol in which a cell performs transmission should be started within the CP. The above operation in which the UE discerns a DL transmission timing of the eNB has the same meaning as an operation in which the UE and the eNB adjust synchronization. For this purpose, transmission of a synchronization signal at at least a preset timing for an arbitrary cell should be guaranteed.

In the NR system to which the present invention is applicable, it is desired to minimize a DL signal which is always transmitted in order to raise power consumption efficiency of the network. From this viewpoint, the synchronization signal may be used for DL measurement (for cell selection) for a specific cell, without additionally introducing the DL signal.

It is noted that, when a hybrid BF (or analog BF) scheme is applied, the beam sweeping operation may be applied to transmit the synchronization signal in multiple directions.

In this case, which measurement value, based on the synchronization signal to which beam sweeping is applied, will be used as the DL measurement value needs to be defined. Therefore, the present invention proposes a method in which the UE measures a maximum value among received power values of synchronization signals in respective symbols in every time interval and then uses a time-axis average value (or a value to which time-axis filtering is applied) of the measured values as the DL measurement value, when the eNB transmits the synchronization signals to which the beam sweeping operation is applied in N symbols (or time units) of a periodically repeated time interval.

The above operation may imply that the UE uses average link quality as the DL measurement value under the assumption that a specific cell provides a service to the UE in an analog beam direction in which received power is maximized among analog beam directions in each symbol according to the beam sweeping operation.

Alternatively, as in (2) of the above-described first DL measurement method, the UE may use a maximum value among the average values X for respective symbols as the DL measurement value for the purpose of performing cell selection and use M large values among the average values X for respective symbols as the DL measurement value for the purpose of reporting a measurement result for a neighbor cell to a serving cell.

Figure 12:
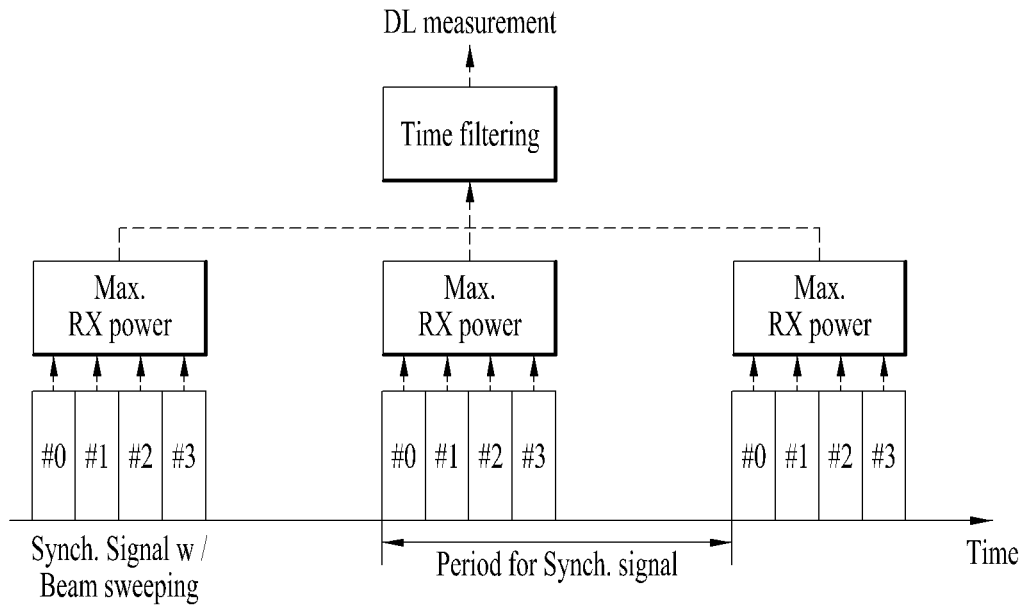
FIG. 12 is a diagram schematically illustrating an exemplary operation of selecting a maximum value of received power values of synchronization signals in respective symbols and using a value to which time-axis filtering is applied as a DL measurement value, when a synchronization signal to which beam sweeping is applied is transmitted in 4 symbols, according to the present invention.

FIG. 12 is a diagram schematically illustrating an exemplary operation of selecting a maximum value of received power values of a synchronization signal in respective symbols and using a value to which time-axis filtering is applied as a DL measurement value, when a synchronization signal to which beam sweeping is applied is transmitted in 4 symbols, according to the present invention.

However, when the eNB is capable of providing a service for a long time only in one analog beam direction among analog beam directions for respective symbols according to the beam sweeping operation, the UE may measure the received power values of the synchronization signals in respective symbols in every periodic time interval in which the synchronization signals are transmitted, acquire a time-axis average value X (or a value to which time-axis filtering is applied) of the measured values on a symbol-by-symbol basis, and then use a maximum value of the average values X for the respective symbols as the DL measurement value.

Figure 13:
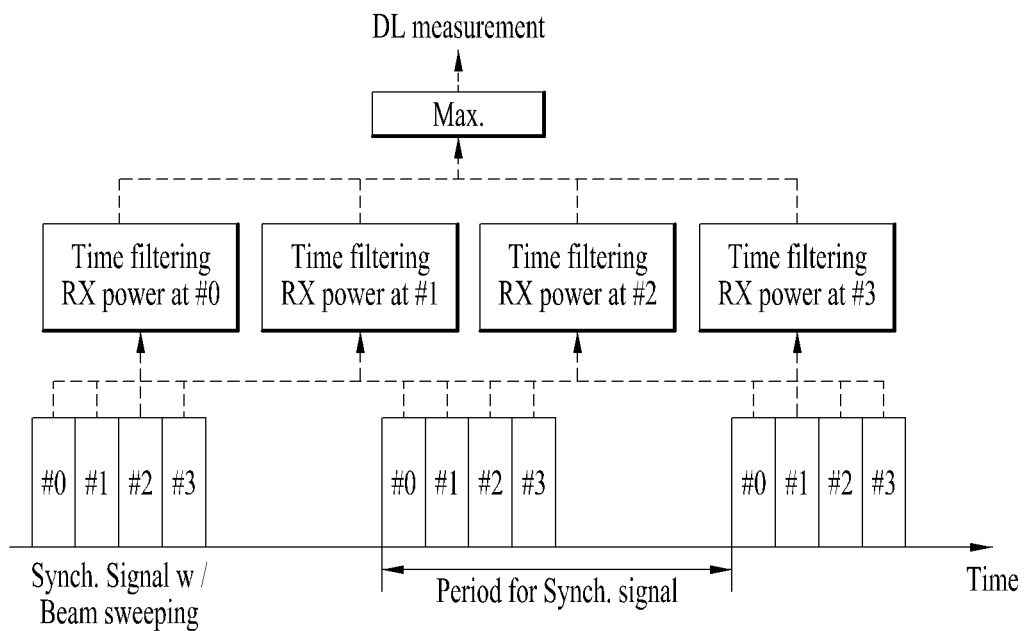
FIG. 13 is a diagram schematically illustrating another exemplary operation of calculating an average received power value of a synchronization signal in respective symbols and using a maximum value as a DL measurement value, when a synchronization signal to which beam sweeping is applied is transmitted in 4 symbols, according to the present invention.

FIG. 13 is a diagram schematically illustrating another exemplary operation of calculating an average received power value of synchronization signals on a symbol-by-symbol basis and using a maximum value as a DL measurement value, when a synchronization signal to which beam sweeping is applied is transmitted in 4 symbols, according to the present invention.

The above-described first DL measurement method may be applied together with other proposed methods of the present invention by a combination with the proposed methods unless they are contradictory to each other.

Hereinafter, features of the above-described synchronization signal which is applicable to DL measurement will be described in detail.

3.1.1.1. First Embodiment Regarding Synchronization Signal

The synchronization signal may include two types of signals, i.e., a primary synchronous signal (PSS) and a secondary synchronous signal (SSS). The eNB may repeatedly transmit synchronization signals (e.g., PSSs and SSSs) for a specific cell with respect to a plurality of time units (within a time interval) in periodically repeated time intervals and the UE may perform DL measurement under the assumption that the PSSs of the repeatedly transmitted synchronization signals in a plurality of time units have a quasi co-located (QCL) relationship and the SSSs of the repeatedly transmitted synchronization signals do not have a QCL relationship.

Herein, if a QCL relationship is established between antenna ports of different DL signals, this means that delay spread, Doppler spread, Doppler shift, average gain, average delay, or arrival/departure angles of a channel which can be derived from one antenna port can be equally applied to another antenna port.

As a specific example, it is assumed that the eNB transmits the synchronization signal and the UE performs RRM (for cell selection) based on the synchronization signal. If a specific cell of the NR system to which the present invention is applicable includes a plurality of TRPs and the plural TRPs transmit the synchronization signals using a single-frequency network (SFN) scheme, RRM performed by the UE reflects link quality which is distorted (or estimated to be higher than in actuality) by considering link quality of channels which are aggregated from all TRPs, rather than link quality of a TRP which is to be actually serviced.

As a method of solving the above problem, the eNB may perform control such that the synchronization signals are transmitted on orthogonal resources which are distinguished according to each TRP so as not to add the synchronization signals used for RRM by the SFN scheme.

In consideration of unified design in the case in which a single-beam based operation is applied and in the case in which a multi-beam based operation is applied, the synchronization signals may be repeatedly transmitted in a plurality of time units (e.g., symbols).

That is, in the single-beam based operation, the same analog beam may be applied to a plurality time units in which the synchronization signal is transmitted and, in the multi-beam based operation, a different (or independent) analog beam may be applied to each time unit in a plurality of time units in which the synchronization signal is transmitted.

The eNB may perform control such that different TPRs (or a TRP groups) may transmit the synchronization signal for RRM per time unit in a plurality of time units (for synchronization signal transmission) according to the unified design in order to avoid a link quality distortion problem in the SFN transmission scheme.

Then, the UE may assume that synchronization signals transmitted for RRM in a plurality of time units do not have a QCL relationship. That is, the UE may assume that synchronization signals transmitted in different time units among the plurality of time units are transmitted from different TRPs.

A synchronization signal may include one or more signals and include a synchronization signal which distinguishes between TRPs and a synchronization signal which does not distinguish between TRPs For example, the synchronization signal may include a PSS and an SSS. The PSS may be used by the UE for coarse synchronization. It is desirable for a plurality of TRPs to transmit the PSS by the SFN scheme. The SSS may be used for fine synchronization and may have a cell ID based sequence. Therefore, SSSs transmitted by different TRPs (or TRP groups) may be transmitted on different orthogonal resources.

When PSSs and SSSs are repeatedly transmitted in a plurality of time units, the UE may assume that the PSSs which are repeatedly transmitted in the plural time units have a QCL relationship and the SSSs which are repeatedly transmitted in the plural time units do not have a QCL relationship.

The first embodiment regarding the synchronization signal may be applied in combination with other proposed methods of the present invention unless there is conflict therebetween.

3.1.1.2. Second Embodiment Regarding Synchronization Signal

As described above, the synchronization signal may include two types of signals, i.e., the PSS and the SSS. When the eNB transmits the synchronization signal for a specific cell, an SSS sequence (or PSS sequence) may indicate one or more of the following operations as an operation of a specific eNB.

(1) Single-beam based operation (a cell uses a single analog beam)

(2) Multi-beam based operation (a cell uses two or more plural analog beams)

(3) Single-TRP based operation (a cell includes a single TRP)

(4) Multi-TRP based operation (a cell includes two or more TRPs)

Herein, the SSS may be used for the purpose of indicating a cell ID.

Additionally, when the eNB repeatedly transmits specific synchronization signals in a plurality of time units in a periodically repeated time interval, an SSS sequence (or a PSS sequence) may indicate that a QCL relationship between the specific synchronization signals (e.g., SSSs) which are repeatedly transmitted within the plural time units corresponds to one of the following relationships.

1) A QCL relationship is established between repeatedly transmitted SSSs in a plurality of time units.

2) A QCL relationship is not established between repeatedly transmitted SSSs in a plurality of time units.

When the eNB indicates that the eNB performs a single-TRP based operation, the UE may assume that a QCL relationship is established between SSSs which are repeatedly transmitted in the plural time units. On the other hand, when the eNB indicates that the eNB performs a multi-TRP based operation, the UE may assume that a QCL relationship is not established between SSSs which are repeatedly transmitted in the plural time units. In this case, a method of indicating whether a single-TRP based operation is performed or a multi-TRP based operation is performed may be indicated as in the above-described fourth DL measurement method.

As described above, the synchronization signal in the NR system to which the present invention is applicable may include the PSS and the SSS. The PSS may be transmitted as a single sequence by cells in the same network, whereas the SSS may be transmitted as a sequence based on a different cell ID per cell.

In an example, a synchronization signal transmission scheme (e.g., whether a beam sweeping operation is performed or not) may differ according to whether the operation of the eNB is a single-beam based operation or a multi-beam based operation. Therefore, if whether a specific cell performs a single-beam based operation or a multi-beam based operation is indicated to the UE, this may aid in an efficient reception procedure of the UE.

For example, in the single-beam based operation, the UE may assume that the synchronization signal is transmitted in a single symbol without a beam sweeping procedure. Alternatively, in the multi-beam based operation, the UE may assume that the synchronization signal is transmitted in a plurality of symbols according to the beam sweeping procedure.

As a method supporting the above operations, the present invention proposes a method of configuring a plurality of SSS sequence groups, wherein each SSS sequence group (or each PSS sequence) indicates a specific eNB operation.

The plural SSS sequence groups (or PSS sequences) may indicate whether a single-beam based operation is performed or a multi-beam (two or more beams) based operation is performed and indicate whether a cell includes a single TRP or multiple TRPs (two or more TRPs).

Additionally, when the eNB repeatedly transmits the synchronization signals in a plurality of time units within a specific time interval, the eNB may implicitly inform the UE of a QCL relationship between the repeatedly transmitted synchronization signals through the SSS sequence groups (or PSS sequences).

The second embodiment regarding the synchronization signal may be applied in combination with other proposed methods of the present invention unless there is conflict therebetween.

3.1.1.3. Third Embodiment Regarding Synchronization Signal

When the eNB repeatedly transmits specific synchronization signals (e.g., SSSs) for a specific cell in a plurality of time units (within a time interval) in periodically repeated time intervals, the UE may differently perform synchronization signal based RRM according to a QCL relationship between the synchronization signals which are repeatedly transmitted in the plural time units.

For example, if a QCL relationship is established between the repeatedly transmitted synchronization signals, the UE may use all average values (or filtered values) of DL measured values in the plural time units (at every period) for the purpose of RRM. Alternatively, if a QCL relationship is not established between the repeatedly transmitted synchronization signals, the UE may calculate a DL measurement value as in the above-described first and third DL measurement methods and then use the value for the purpose of RRM.

Herein, if a QCL relationship is established between antenna ports of different DL signals, this means that delay spread, Doppler spread, Doppler shift, average gain, average delay, or arrival/departure angles of a channel which can be derived from one antenna port can be equally applied to another antenna port.

Specifically, when the eNB repeatedly transmits the synchronization signals in a plurality of time units (within a time interval) of a periodically repeated time interval, if the synchronization signals are transmitted by the same TRP, the UE may use an average value of DL measurement values based on the repeatedly transmitted synchronization signals for synchronization signal based RRM.

If the synchronization signals are transmitted by different TRPs in respective time units in a plurality of time units, the UE may use a time-axis average value of maximum values of DL measurement values based on the repeatedly transmitted synchronization signals for the purpose of RRM. The UE may calculate a measurement value when the UE is serviced from a TRP having good reception sensitivity at every moment or calculate a time-axis average value of DL measurement values on a time unit basis. Thereafter, the UE may use a maximum value of a plurality of time-axis average values in the plural time units for RRM. Then, the UE may calculate a measurement value in which link quality is reflected when the UE is serviced for a long time from a specific TRP.

If a QCL relationship is established between the synchronization signals transmitted in a plurality of time units, the UE may perform RRM under the assumption that a single-TRP operation is performed. If a QCL relationship is not established between the synchronization signals transmitted in a plurality of time units, the UE may perform RRM for distinguishing between TRPs (e.g., RRM upon selecting the best TRP at every moment or RRM upon selecting the best TRP from the perspective of an average).

The third embodiment regarding the synchronization signal may be applied in combination with other proposed methods of the present invention unless there is conflict therebetween.

3.1.1.4. Fourth Embodiment Regarding Synchronization Signal

As described above, when the synchronization signal includes two types of signals, i.e., the PSS and the SSS, and the eNB repeatedly transmits the synchronization signals (e.g., PSS and SSS) for a specific cell with respect to a plurality of time units (within a time interval) in a periodically repeated time interval, the UE may calculate a DL timing by a different method according to a QCL relationship between the synchronization signals repeatedly transmitted in the plural time units.

For example, when a QCL relationship is established between the repeatedly transmitted synchronization signals, the UE may use all measurement values (e.g., correlation values) (for the synchronization signals) in the plural time units at every period for DL timing calculation. As a specific example, the UE may calculate the DL timing using a value of adding the measurement values.

Alternatively, when the QCL relationship is not established between the repeatedly transmitted synchronization signals, the UE first calculates the largest time unit of a synchronization signal based DL measurement values among the plural time units and uses a measurement value (e.g., correlation value) (for the synchronization signals) in a corresponding time unit for DL timing calculation.

More specifically, it is assumed that the eNB repeatedly transmits the synchronization signals for a specific cell with respect to plural time units (within a time unit) in periodically repeated time intervals, the PSSs are transmitted using an SFN scheme by plural TRPs in a cell, and the SSSs are repeatedly transmitted by a single TRP within a cell with respect to the plural time units (when the QCL relationship is established) or are transmitted by different TRPs in different time units with respect to the plural time units (when the QCL relationship is not established).

In this case, the UE may desirably use all measurement values for a DL timing calculation procedure by regarding measurement values for the SSSs which are repeatedly transmitted in the plural time units by a single TRP as measurement values at a single DL timing.

The UE may select only a measurement value for a specific time unit and use the measurement value for DL timing calculation by regarding measurement values for the SSSs which are transmitted in different time units by different TRPs in plural TRPs as measurement values for different DL timings.

For example, the UE may first detect a time unit having the largest DL measurement value for the SSS among the plural time units and then use a measurement value in a corresponding time unit for DL timing calculation. This operation may mean that the UE calculates a DL timing for a TRP having the best reception sensitivity in terms of the UE.

The fourth embodiment regarding the synchronization signal may be applied in combination with other proposed methods of the present invention unless there is conflict therebetween.

3.1.2. Second DL Measurement Method

The eNB may transmit an MRS to which a numerology applied to the synchronization signal is applied (or default numerology) is applied in a specific band (relatively) defined based on a frequency resource on which the synchronization signal is transmitted and then the UE may perform DL measurement (for cell selection) using the MRS in the specific band. In this case, the time interval in which the MRS is transmitted may be derived from a timing at which the synchronization signal is transmitted.

More specifically, in the NR system to which the present invention is applicable, the MRS, which is an additional DL RS distinguished from the synchronization signal, may be introduced as a signal for DL measurement (for cell selection). In this case, the MRS should be used even by a UE which is not capable of communicating with a specific cell or an eNB.

A UE needs to adjust DL synchronization with a DL measurement target cell for DL measurement. The UE may assume that location information of a resource on which the synchronization signal for the DL measurement target cell is transmitted is acquired before performing DL measurement.

In this case, a transmission resource of the MRS for DL measurement may be indicated through the location information of a resource on which the synchronization signal previously acquired by the UE is transmitted. In addition, in the NR system to which the present invention is applicable, considering that numerology may differ on an SF (or TTI) by SF basis, numerology applied to at least the synchronization signal may be defined to be equally applied to numerology for the MRS. For example, the UE may assume that a specific frequency band is defined based on a frequency resource on which the synchronization signal is transmitted and numerology applied to the specific frequency band is the same as numerology applied to the synchronization signal. According to the above operation, while the UE performs MRS based DL measurement in an arbitrary cell, the UE may infer an MRS resource location only by synchronization acquisition thereof. Therefore, signaling overhead of the eNB for indicating an MRS resource and a detection operation of the UE may be omitted.

Figure 14:
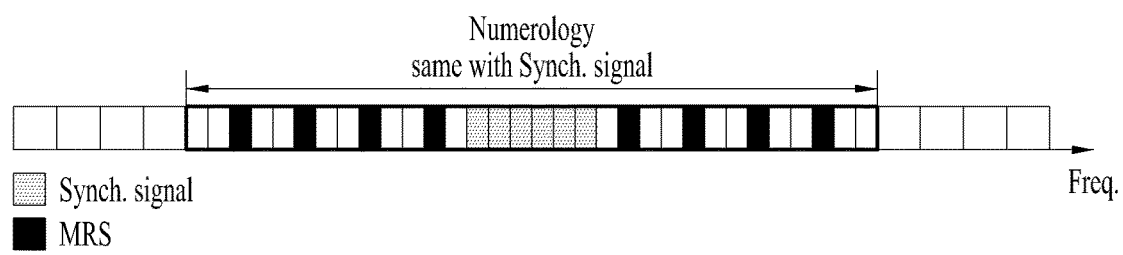
FIG. 14 is a diagram schematically illustrating a configuration in which a predetermined frequency band centering on a synchronization signal is configured to apply the same numerology as numerology of the synchronization signal and an MRS is transmitted in the frequency band according to the present invention.

FIG. 14 is a diagram schematically illustrating a configuration in which a predetermined frequency band centering on a synchronization signal is configured to apply the same numerology as numerology of the synchronization signal and an MRS is transmitted in the frequency band according to the present invention.

The second DL measurement method may be applied in combination with other proposed methods of the present invention unless there is conflict therebetween.

3.1.3. Third DL Measurement Method

The eNB may apply a beam sweeping operation with respect to N symbols (or time units) in a periodically repeated time interval. Herein, if the eNB transmits an MRS having M antenna ports distinguished by orthogonal resources in each symbol with respect to L sequences, the UE may acquire a DL measurement value (for cell selection) using one of the following methods.

(1) The UE may measure a maximum value among received power values of the MRSs with respect to respective combinations of {sequence, symbol, antenna port} in every time interval and use a time-axis average value (or a value to which time-axis filtering is applied) of the measured values as the DL measurement value.

(2) The UE may measure a maximum value among added received power values of the MRSs for antenna ports with respect to respective combinations of {sequence, symbol} in every time interval and use a time-axis average value (or a value to which time-axis filtering is applied) of the measured values as the DL measurement value.

(3) The UE may measure received power values of the MRSs with respect to respective combinations of a {sequence, symbol, antenna port} in every time interval, acquire a time-axis average value X (or a value to which time-axis filtering is applied) of the measurement values, and use a maximum value (or K large values) among the average values X with respect to respective combinations of {sequence, symbol, antenna port} as the DL measurement value.

(4) The UE may measure added received power values of the MRSs for antenna ports with respect to respective combinations of a {sequence, symbol} in every time interval, acquire a time-axis average value X (or a value to which time-axis filtering is applied) of the measurement values, and use a maximum value (or K large values) of the average values X with respect to respective combinations of {sequence, symbol} as the DL measurement value.

(5) The UE may measure a maximum value of received power values of the MRSs in respective combinations of {symbol, antenna port} in every time interval with respect to each sequence, acquire a time-axis average value X (or a value to which time-axis filtering is applied) of the measurement values, and use a maximum value (or K large values) of the average values X with respect to respective sequences as the DL measurement value.

(6) The UE may measure a maximum value among added received power values of the MRSs for antenna ports in respective symbols in every time interval with respect to each sequence, acquire a time-axis average value X (or a value to which time-axis filtering is applied) of the measurement values, and use a maximum value (or K large values) of the average values X with respect to respective sequences as the DL measurement value.

Herein, the beam sweeping operation of the eNB represents an operation of changing an analog beam direction (of each TXRU) with respect to a plurality of symbols (or time resources).

In addition, a time interval in which the MRS is transmitted may be derived from a timing at which the synchronization signal is transmitted.

In the above operation, the UE may assume that $N=N_0$, $M=M_0$, and $L=L_0$, wherein $N_0$, $M_0$, and $L_0$ are preset values.

In above operation, DL measurement methods corresponding to the methods (3), (4), (5), and (6) may also be used to select a TRP/beam.

In the above-described configuration, a "symbol" may mean a "symbol index".

In the above-described third DL measurement method, the "symbol" may be replaced with a "time unit corresponding to a beam sweeping unit" or a "time unit in which beams can be distinguished from the perspective of reception". For example, in the NR system to which the present invention is applicable, a synchronization block, which is a resource unit including a synchronization signal, a PBCH, and/or an MRS, may be defined and, when the eNB applies the beam sweeping operation to the synchronization block, "symbol" may be replaced with "synchronization block".

More specifically, when an additional MRS is introduced in the NR system to which the present invention is applicable, the MRS may be designed such that the UE may perform DL measurement (for selecting a TRP/beam) through the MRS.

As an example, when the eNB transmits a signal by applying a hybrid BF (or analog BF) scheme, it is assumed that a cell includes a plurality of TRPs and each TRP simultaneously transmits a plurality of analog beams in one time resource. In this case, since the synchronization signal is one value representing the cell, the synchronization signal may be transmitted using the same resource and the same sequence in all TRPs and all analog beams capable of performing simultaneous transmission.

However, the MRS can distinguish between TRPs and simultaneously transmitted analog beams as opposed to the synchronization signal. For example, the MRS may distinguish between TRPs by different sequences and between simultaneously transmitted analog beams by different orthogonal resources.

If an infinite number of distinguishable TRPs and an infinite number of distinguishable analog beams are supported, this is undesirable in terms of measurement complexity of the UE. Therefore, the eNB may transmit the MRS having up to $M_{MAX}$ antenna ports, which are distinguished by orthogonal resources in each MRS transmission symbol, using up to $L_{MAX}$ sequences according to a beam sweeping operation.

Next, the UE may calculate the DL measurement value according to one of (1) to (6) of the above-described third DL measurement method.

The DL measurement value corresponding to (1) indicates average link quality when the UE is serviced by a single beam having the highest power received in a cell. The DL measurement value corresponding to (2) indicates average link quality when the UE is serviced by a set of a plurality of beams (which can be simultaneously transmitted) in the same TRP having the highest power received in a cell. The DL measurement value corresponding to (3) indicates maximum link quality when the UE is serviced by a specific single beam in a specific TRP for a long time. The DL measurement value corresponding to (4) may indicate maximum link quality when the UE is serviced by a set of a plurality of beams (which can be simultaneously transmitted) in a specific TRP for a long time. The DL measurement value corresponding to (5) may indicate maximum link quality when the UE is serviced by a specific TRP for a long time and by a single beam having the highest power received in the TRP. The DL measurement value corresponding to (6) may indicate maximum link quality when the UE is serviced by a specific TRP for a long time and by a set of a plurality of beams (which can be simultaneously transmitted) having the highest power received in the TRP.

The third DL measurement method may be applied in combination with other proposed methods of the present invention unless there is conflict therebetween.

3.1.4. Fourth DL Measurement Method

The eNB may indicate, to the UE, which of a single-beam operation and a multi-beam operation is applied to a cell corresponding to the eNB through one or more combinations of the following features.

(1) A sequence of a synchronization signal (2) Location(s) of resource(s) on which the synchronization signal is transmitted (3) Numerology (e.g., a subcarrier spacing) applied to the synchronization signal In the single-beam operation, the UE may perform DL measurement under the assumption that the N value in the above-described first DL measurement method or third DL measurement method is 1 and, in the multi-beam operation, the UE may perform DL measurement under the assumption that the N value in the above-described first DL measurement method or third DL measurement method is a preset value $N_0$.

The single-beam operation or the multi-beam operation indicate operations when a TRP transmits an analog beam (per TXRU) only in a single direction and in (one or more) plural directions, respectively.

Figure 15:
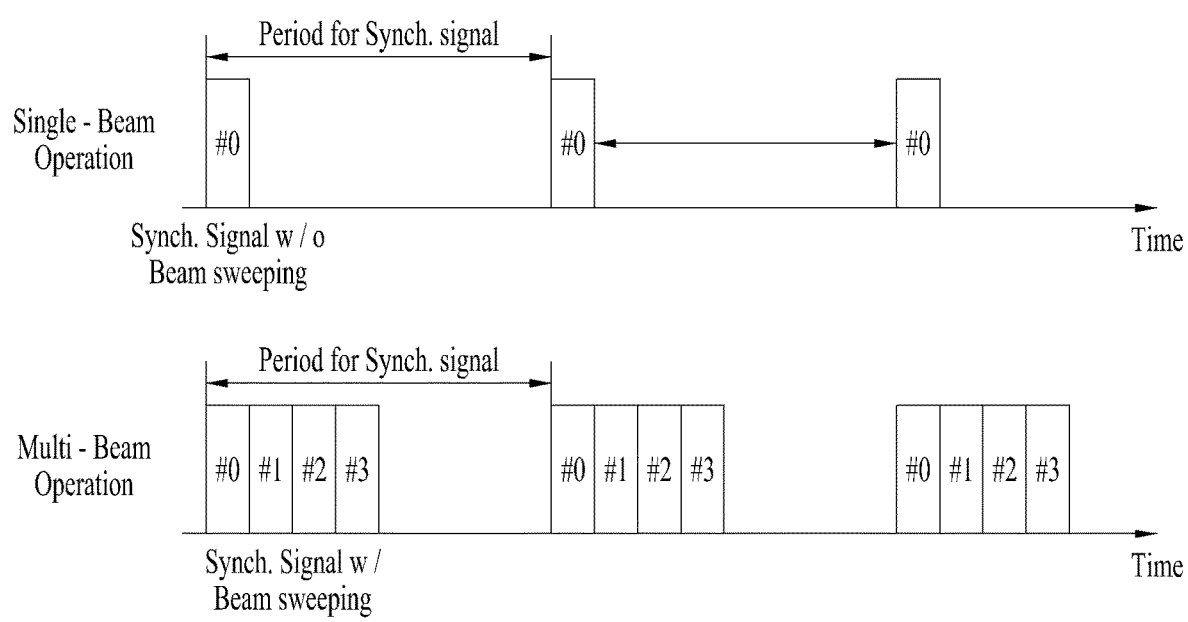
FIG. 15 is a diagram schematically illustrating configurations to which a single-beam operation or a multi-beam operation is applied according to the present invention.

FIG. 15 is a diagram schematically illustrating configurations to which a single-beam operation or a multi-beam operation is applied according to the present invention.

As illustrated in FIG. 15, a synchronization signal may be transmitted by applying an single beam or beam sweeping according to whether a single-beam operation is applied or a multi-beam operation is applied.

If the UE is not aware of whether the single-beam operation of the eNB is applied or the multi-beam operation of the eNB is applied, the UE should perform DL measurement (for cell selection) under the assumption that beam sweeping based on a multi-beam operation according to the above-described first DL measurement method (or third DL measurement method) has been applied to the synchronization signal (or MRS). However, unlike the assumption of the UE, if the eNB has substantially performed the single-beam operation, the UE performs an unnecessary measurement operation for a symbol in which the synchronization signal (or MRS) has not been transmitted.

To reduce the above unnecessary measurement operation of the UE, the eNB may indicate, to the UE, which of the single-beam operation and multi-beam operation has been applied to the eNB through the sequence, transmission resource location, and numerology applied to the synchronization signal.

The fourth DL measurement method may be applied in combination with other proposed methods of the present invention unless there is conflict therebetween.

3.1.5. Fifth DL Measurement Method

The eNB may transmit an MRS in a periodically repeated time interval and the UE may calculate an MRS based measurement value in every time interval and then apply time-axis filtering to the measurement values in order to acquire a DL measurement value (for the purpose of selecting a TRP/beam) (in a specific cell). In this case, the UE may apply a median filter as time-axis filtering (or previous filtering before applying time-axis filtering).

Herein, a filter coefficient for the median filter and the time interval may be configured for the UE by the eNB through a higher-layer signal.

More specifically, when the UE performs DL measurement (for selecting the TRP/beam) based on the MRS transmitted by the eNB, the best TRP/beam from the perspective of reception of the UE may be relatively rapidly changed due to rotation and high-speed movement of the UE.

Therefore, the UE may desirably acquire the latest MRS measurement value for the DL measurement value (for selecting the TRP/beam). However, if the UE reflects only the latest measurement value to the DL measurement value (for selecting the TRP/beam), a temporary channel fading phenomenon may occur so that the best TRP/beam may be frequently changed.

Accordingly, as a method of excluding a received power value caused by the temporary fading phenomenon from a TRP/beam selection procedure, the present invention proposes a method of applying a median value filter as time-axis filtering (or previous filtering before applying time-axis filtering) when the UE measures MRS based measurement values in every time interval and performs DL measurement (for selecting the TRP/beam) by applying time-axis filtering to the measurement values.

The fifth DL measurement method may be applied in combination with other proposed methods of the present invention unless there is conflict therebetween.

3.1.6. Sixth DL Measurement Method

If the eNB supports synchronization signal transmission and MRS transmission, the UE may perform DL measurement (for cell selection) through the following procedures.

(1) The UE selects a cell group in which a synchronization signal based DL measurement value satisfies a specific condition (e.g., the value is equal to greater than a threshold value (TH1)).

In this case, synchronization signal based DL measurement may be performed according to the above-described first DL measurement method.

(2) The UE performs MRS based DL measurement (in each cell) for the cell group.

In this case, if the UE is in an idle state (in which connection with a network is not formed), the UE may select a cell having the largest MRS based DL measurement value or an arbitrary cell in which the measurement value satisfies a specific condition (e.g., the value is equal to or greater than a predetermined threshold value (TH2)).

If the UE is in a connected state (in which connection with the network is formed), the UE may report an MRS based DL measurement value for a cell group in which the MRS based DL measurement value satisfies a specific condition (e.g., the value is equal to or greater than the threshold value (TH2)).

Herein, MRS based DL measurement may be performed according to the above-described third DL measurement method.

In this case, TH1 and TH2 may be different values, preset values (when the UE is in an idle state), or values configured by the eNB through a higher-layer signal (when the UE is in a connected state).

As a specific example, it is assumed that a cell includes a plurality of TRPs and each TRP operates a plurality of analog beams (groups) according to an analog BF scheme. It is also assumed that the eNB controls a specific cell to transmit a plurality of MRS resources through which all or some of the plural TRPs or beams can be distinguished.

When the UE performs DL measurement (for cell selection) based on the MRS resources, the UE may relatively accurately estimate link quality which is to be serviced later. However, since the UE should perform measurement for the plural MRS resources in each cell, substantial processing time may be consumed.

Alternatively, if the UE performs DL measurement (for cell selection) based on the synchronization signal, since the UE performs measurement for one synchronization signal, processing time may be reduced. However, estimation by the UE for link quality to be actually serviced may become somewhat inaccurate (e.g., overestimation or underestimation of link quality).

Therefore, the present invention proposes a method of raising accuracy while reducing processing time of the UE by combining DL measurement methods based on the above two DL signals.

Figure 16:
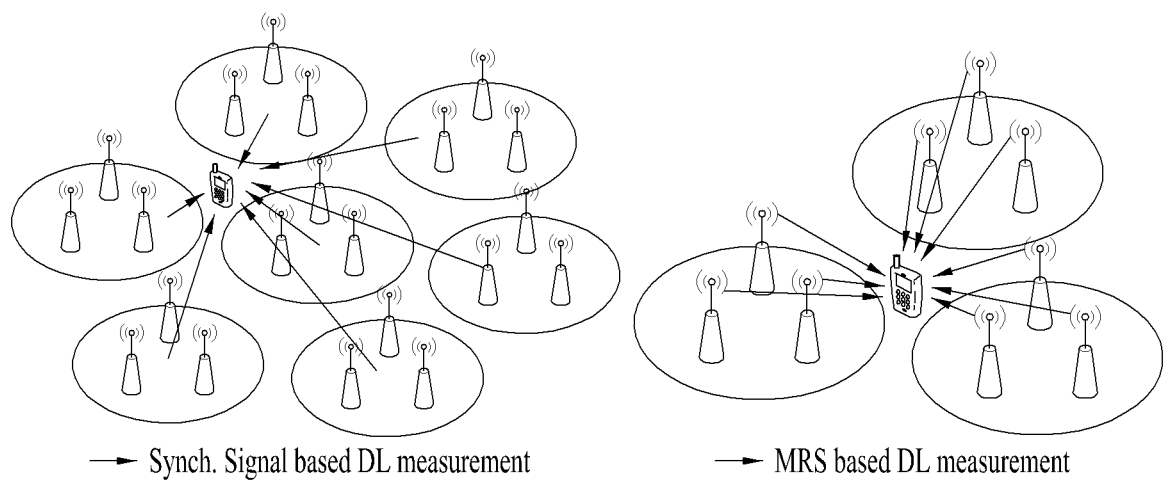
FIG. 16 is a diagram schematically illustrating exemplary DL measurement methods of the UE by combining DL measurement methods based on two DL signals according to the present invention.

FIG. 16 is a diagram schematically illustrating exemplary DL measurement methods of the UE by combining DL measurement methods based on two DL signals according to the present invention.

First, as illustrated in the left side of FIG. 16, the UE may select M cells in which a synchronization signal based DL measurement value is equal to or greater than a predetermined threshold value. As illustrated in the right side of FIG. 16, the UE may perform MRS based DL measurement for each of the M cells and select a cell having the largest measurement value or report measurement values for cells having values equal to or greater than a predetermined threshold value to the network.

The sixth DL measurement method may be applied in combination with other proposed methods of the present invention unless there is conflict therebetween.

3.1.7. Seventh DL Measurement Method

In the present invention, a change event of the synchronization signal may represent that the synchronization signal having the largest DL measurement value is changed (e.g., in terms of sequence). In this case, the DL measurement value may be one of the following values.

(1) A maximum value among received power values of the synchronization signals measured on a plurality of orthogonal resources in the latest synchronization signal transmission interval.

(2) A DL measurement value measured according to the first DL measurement method (in this case, the time-axis filtering scheme is performed in a first layer or second layer).

(3) A DL measurement value measured according to the first DL measurement method (in this case, the time-axis filtering scheme is performed in a third layer).

In this case, the UE may define a high-speed mobility mode based on the above-described change event of the synchronization signal as follows.

1) Case in which time length between two different change events of the synchronization signal is equal to or less than specific time length 2) Case in which the number of occurrences of change events of the synchronization signal in a predetermined time interval is equal to or greater than a predetermined number If the UE is not in the high-speed mobility mode, the UE may perform MRS based DL measurement as a DL measurement method (for cell selection) and, if the UE is in the high-speed mobility mode, the UE may perform synchronization signal based DL measurement as the DL measurement method (for cell selection). In this case, synchronization signal based DL measurement may be performed as in the above-described first DL measurement method and MRS based DL measurement may be performed as in the above-described third DL measurement method.

As described above, if the UE performs DL measurement (for cell selection) based on the MRS resources, the UE may perform relatively accurate estimation for link quality to be serviced later, whereas substantial processing time may be consumed to perform measurement for a plurality of MRS resources in each cell. On the contrary, if the UE performs DL measurement (for cell selection) based on the synchronization signal, the UE may reduce processing time, whereas estimation for link quality to be actually serviced may become inaccurate (e.g., overestimation or underestimation of link quality).

If the UE does not need to particularly perform fast cell selection, the UE desirably performs MRS based DL measurement for cell selection. However, if it is necessary to minimize time latency of a cell selection procedure by high-speed movement of the UE, the UE desirably performs synchronization signal based DL measurement for cell selection.

From this viewpoint, the present invention proposes a method of defining a high-speed mobility mode based on how much the synchronization signal having the best sensitivity is changed in terms of DL measurement, performing cell selection by performing synchronization signal based DL measurement when the UE is in the high-speed mobility mode, and performing cell selection by performing MRS based DL measurement when the UE is not in the high-speed mobility mode.

The seventh DL measurement method may be applied in combination with other proposed methods of the present invention unless there is conflict therebetween.

3.1.8. Eighth DL Measurement Method

Hereinafter, for convenience of description, a state in which the UE does not form higher-layer connection (e.g., RRC connection) with the network will be referred to as an RRC-idle mode and a state in which the UE forms higher-layer connection with the network will be referred to as a RRC-connected mode. Additionally, a state in which the UE maintains minimum higher-layer connection will be referred to as a RAN-controlled mode.

In the present invention, when a cell includes a plurality of TRPs and each TRP may operate a plurality of beams, a cell-specific measurement RS which does not distinguish between beams (or TRPs) in the cell is referred to as a C-MRS and a beam-specific measurement RS which distinguishes between beams (or TRPs) in the cell is referred to as a B-MRS.

According to the eighth DL measurement method of the present invention, the eNB may transmit the C-MRS which is distinguished from the synchronization signal to support DL measurement (for cell selection) of the UE and the UE may transmit the B-MRS which is distinguished from the synchronization signal to support DL measurement (for beam or TRP selection) of the UE.

In this case, when the synchronization signal can be transmitted by applying a beam sweeping operation on a plurality of resources, which is called a synchronization block, the C-MRS may be transmitted on time and frequency resources which are included in the synchronization block and distinguished from the synchronization signal or may be transmitted by applying the beam sweeping operation on a resource which is defined independently of the synchronization signal. In addition, RS patterns of the C-MRS may be different in the case in which the C-MRS is transmitted in a specific band in which the synchronization signal is transmitted and in the case in which the C-MRS is transmitted in a specific band in which the synchronization signal is not transmitted.

Herein, the beam sweeping operation represents an operation of changing an analog beam direction (of each TXRU) with respect to a plurality of symbols (or time resources).

In this case, the UE may be aware of resource information regarding the C-MRS through a preagreed scheme with the eNB (or a higher-layer signal) and resource information regarding the B-MRS through system information (e.g., xPBCH or a system information block (SIB)) or a higher-layer signal (e.g., RRC signaling).

Characteristically, the C-MRS may have a minimum transmission resource on which transmission is always guaranteed (in an environment in which a cell operates).

In the NR system to which the present invention is applicable, even if a cell includes a plurality of TRPs and/or beams, it is necessary for the UE to minimize a DL measurement target during DL measurement for a fast cell selection procedure and for a cell selection procedure for reduction in battery consumption of the UE.

As one method for this purpose, the UE may perform DL measurement based on a cell-specific DL signal and the synchronization signal may be considered as the cell-specific DL signal.

However, since the synchronization signal may be designed to be transmitted only within a narrow band in a system band, there may be a problem in that measurement samples based on the synchronization signals are not sufficient.

From this viewpoint, the present invention proposes a method supporting RRM by transmitting a cell-specific measurement RS (C-MRS) which is distinguished from the synchronization signal. The C-MRS may be free of restrictions on a frequency resource as opposed to the synchronization signal. For example, the C-MRS may be transmitted in a total system band.

In an example, the eNB may also transmit a beam-specific measurement RS (B-MRS) to support the beam selection procedure of the UE together with the C-MRS. In this case, the C-MRS may be used when the UE in an RRC-idle mode selects a cell. Therefore, the C-MRS can guarantee a minimum transmission resource available for the UE without additional information.

Additionally, the eNB may have an MRS transmission region in which time and frequency resources and/or numerology are configured through system information such as a PBCH and/or through higher-layer signaling such as RRC signaling with respect to the C-MRS (or B-MRS). In this case, an MRS pattern in an MRS transmission region indicated by the system information and an MRS pattern configured by the higher-layer signal may be differently designed. This is because design considering collision with the synchronization signal should be applied because the MRS pattern within a region indicated by the system information may be transmitted together with the synchronization signal.

The system information based MRS transmission region may be one or more regions distinguished in terms of time and frequency resources and numerology in each region may be independently configured.

Additionally, the C-MRS and the B-MRS may be transmitted in consideration of the bandwidth (BW) of the UE. For example, the C-MRS and the B-MRS may be transmitted through a total BW corresponding to a minimum value among maximum BW values of RRC-idle mode UEs.

The PSS/SSS is transmitted in a relatively narrow band, whereas the C-MRS/B-MRS may be transmitted in a wide band relative to the PSS/SSS. Then, a method of using the C-MRS/B-MRS for measurement can advantageously secure higher measurement accuracy than a method of using the synchronization signal for measurement.

Generally, the PSS/SSS is transmitted in a narrow band in consideration of detection calculation complexity. In this case, since the PSS/SSS is transmitted in a narrow band, the UE may detect the PSS/SSS using a low sampling rate. Next, the UE is capable of acquiring information about a cell ID and a symbol position through the PSS/SSS. Then, the UE is capable of performing signal processing at each specific OFDM symbol position and may operate by raising sampling rate configured during PSS/SSS reception. If the eNB transmits the C-MRS/B-MRS through the narrowest BW among maximum BW values capable of being monitored by a specific UE in an RRC-Idle mode state, the specific UE may receive the C-MRS/B-MRS. Alternatively, a band in which the C-MRS or B-MRS is transmitted may be above a minimum system band which can be configured by the eNB. For example, if a minimum value of a system band which can be configured by the eNB is 5 MHz, the eNB may transmit the C-MRS and/or the B-MRS in a band of a minimum of 5 MHz.

The eighth DL measurement method may be applied in combination with other proposed methods of the present invention unless there is conflict therebetween.

3.1.9. Ninth DL Measurement Method

When the eNB transmits a DL signal for DL measurement (for selecting a cell, a beam, or a TRP) of the UE, the eNB may indicate transmission frequency resource information of the DL signal for DL measurement (for a serving cell and neighbor cell(s)) to a UE (which is in an RRC-connected mode or RAN-controlled mode). Specifically, the eNB may define (or configure) a plurality of subbands for a total system band and inform the UE of whether the DL signal for DM measurement has been transmitted in each subband through a higher-layer signal or system information.

In this case, the size of the subband may be a multiple of a data transmission unit (e.g., a PRB) on the frequency axis.

In addition, a frequency resource on which transmission of the DL signal for DL measurement is always guaranteed may be defined.

The UE may use the DL signal for DL measurement for tracking synchronization on the time axis and synchronization on the frequency axis.

Alternatively, the DL signal for DL measurement may have an additional use purpose in addition to RRM according to a band in which the DL signal is transmitted. For example, the DL signal for DL measurement transmitted in a specific band in which the synchronization signal is transmitted may be used as a DM-RS for a PBCH and the DL signal for DL measurement transmitted in another specific band may be used as a DM-RS for a UE-common DL control channel. In other words, the DL signal for specific DL measurement may be used for an additional purpose in addition to RRM in each frequency band in which the DL signal is transmitted.

In this case, the UE may use the DL signal for DL measurement included in a UE reception (Rx) BW (configured for data reception) for the UE.

The eNB may inform the UE of numerology information in each transmission frequency band (or information about a transmission frequency resource for each numerology) for the DL signal for DL measurement (for serving cell and neighbor cell(s)).

In the above-described configuration, the synchronization signal may be applied as the DL signal for DL measurement.

In the NR system to which the present invention is applicable, the case in which the received bandwidth of the UE is less than a total system band is considered. Then, in the NR system, upon performing DL measurement (for cell selection) (i.e., RRM) for a serving cell of the UE and neighbor cells, it is desirable to support the UE so as to perform RRM without change of a returning procedure for a frequency band configured to receive data. In addition, in consideration of network energy efficiency, it is not always necessary to transmit the DL signal for DL measurement in the total system band. Particularly, if an RF band (or a received frequency band) of the UE is restricted as described above, the DL signal for DL measurement may be desirably transmitted only in a corresponding band.

From this perspective, the present invention proposes a method in which a plurality of subbands in a total system band is defined (or configured) and the eNB transmits a DL signal for DL measurement in each subband and informs the UE of whether the DL signal for DL measurement in the subband has been transmitted through a higher-layer signal or system information. The above-described C-MRS or B-MRS may be applied as the DL signal for DL measurement.

Figure 17:
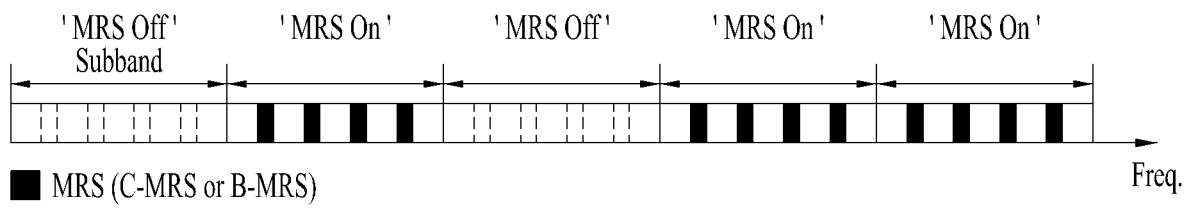
FIG. 17 is a diagram schematically illustrating a configuration in which a C-MRS is transmitted in each subband when a total system band includes 5 subbands.

FIG. 17 is a diagram schematically illustrating a configuration in which a C-MRS is transmitted in each subband when a total system band includes 5 subbands.

Additionally, if the eNB does not separately configure a resource region of a DL signal for DL measurement (for a specific cell) for the UE (through a higher-layer signal), the UE may determine that only an MRS resource indicated by system information is valid and assume that there is a measurement interval indicated, as a basic operation, to perform RRM for a serving cell and neighbor cell(s) in a specific band (e.g., an anchor subband) in which the MRS resource indicated by the system information is transmitted. The measurement interval may be configured through the system information (a PBCH or an SIB) or a higher-layer signal. If the received bandwidth of the UE does not include the anchor subband, the UE may perform inter-frequency measurement including RF bandwidth change in the measurement interval.

Alternatively, the eNB may configure a plurality of (periodic) time and frequency resource regions to which a specific numerology is applied for the UE through the system information (e.g., the PBCH or the SIB) or the higher-layer signal. In this case, a numerology configured in the specific region may be applied to an MRS transmitted in a specific resource region.

Alternatively, when the MRS is transmitted, the UE may assume that signal transmission is performed with a slot (or TTI) structure to which numerology configured by the eNB is applied for the MRS at a timing at which the MRS is transmitted. In other words, the UE may assume that the same numerology as numerology of the MRS is applied to the slot (or the TTI or SF) in which the MRS is transmitted.

For example, when an SF is a reference transmission unit and the slot or the TTI can be defined in the SF, the eNB may configure an SF resource location at which the MRS can be transmitted and configure the numerology for the MRS. In this case, the UE may assume that the numerology configured for the MRS by the eNB is applied to the SF in which the MRS is transmitted so that the slot (or the TTI) in the SF is configured.

The ninth DL measurement method may be applied in combination with other proposed methods of the present invention unless there is conflict therebetween.

3.1.10. 10th DL Measurement Method

When the UE performs DL measurement for a plurality of cells, the UE may perform and then report cell-specific RRM based on a cell-specific DL signal without distinguishing between beams (or TRPs) with respect to a specific cell group (e.g., cell group 1) and perform and report beam-specific RRM based on a beam-specific DL signal by distinguishing between beams (or TRPs) with respect to another specific cell group (e.g., cell group 2).

In this case, one cell may be included in both the above-described specific cell group (e.g., cell group 1) and another specific cell group (e.g., cell group 2).

The eNB may configure measurement resource information regarding target cells performing cell-specific RRM and target cells performing beam-specific RRM, for the UE, through the higher-layer signal.

If a cell-specific (or beam-specific) RRM value satisfies a specific condition, the UE may report a cell-specific (or beam-specific) RRM value for a corresponding cell (or beam).

Herein, the cell-specific DL signal for cell group 1 may differ according to an operation mode (e.g., RRC-idle mode or RRC-connected mode (or RAN-controlled mode)) of the UE.

Additionally, the eNB may inform the UE of whether the cell-specific DL signal is used or the beam-specific DL signal is used for cell group 1.

The eNB may command cells belonging to cell group 2 to report beam-specific RRM and cell-specific RRM quantities based on the beam-specific DL signal.

Hereinafter, in the NR system to which the present invention is applicable, it will be assumed that the UE should perform DL measurement for a plurality of cells and each cell has a plurality of beams.

Upon performing DL measurement (i.e., RRM), the UE may support handover (HO) between cells by performing cell-specific RRM. To this end, the UE may perform cell-specific RRM using the cell-specific DL signal which does not distinguish between beams.

If the UE is subjected to considerable interference from a specific beam of cells adjacent to a serving cell, the UE may report information about an interfering beam to the serving cell thereof. In this case, the UE may perform and report beam-specific RRM based on the beam-specific DL signal which distinguishes between beams (of a neighbor cell).

In this case, a target cell for cell-specific RRM and a target cell for beam-specific RRM may be configured by the eNB for the UE through a higher-layer signal. Then, the UE may report only an RRM value satisfying a predetermined condition among RRM values to the eNB.

In the above configuration, the above-described C-MRS may be used as the cell-specific DL signal and the above-described B-MRS may be used as the beam-specific DL signal. Desirably, the two RSs may be distinguished from each other.

As a modification example, the eNB may inform the UE of information about a target for performing and reporting beam-specific RRM based on the beam-specific DL signal which distinguishes between the TRPs (or beams) in the form a beam (or TRP) measurement resource list.

If the UE is commanded to perform cell-specific RRM, the UE may report only a cell-specific RRM value satisfying a specific condition among cell-specific RRM values. Similarly, if the UE is commanded to perform beam-specific RRM, the UE may report only a beam-specific RRM value satisfying a specific condition among beam-specific RRM values.

The tenth DL measurement method may be applied in combination with other proposed methods of the present invention unless there is conflict therebetween.

3.1.11. 11th DL Measurement Method

When the eNB transmits the C-MRS for RRM, the UE may change the type of a DL signal using the C-MRS according to a frequency band in which (cell-specific) RRM is performed.

As a specific example, in the NR system to which the present invention is applicable, it is assumed that a synchronization signal designed to be cell-specific is transmitted in a partial band in a total system band. If the received bandwidth of the UE is less than the total system band, the type of the DL signal used as the C-MRS may differ according to whether the synchronization signal is present within the received bandwidth of the UE.

For example, if the synchronization signal is present within the received bandwidth of the UE, the UE may perform cell-specific RRM using the synchronization signal as the C-MRS.

If the synchronization signal is not present within the received bandwidth of the UE, the eNB may configure an additional C-MRS (having design different from the synchronization signal) for the UE and the UE may perform cell-specific RRM based on the C-MRS configured by the eNB.

The 11th DL measurement method may be applied in combination with other proposed methods of the present invention unless there is conflict therebetween.

3.1.12. 12th DL Measurement Method

If the eNB is capable of transmitting a DL RS for RRM (hereinafter, a measurement RS or an MRS) as two types of the C-MRS and the B-MRS, RS patterns for the C-MRS and the B-MRS may be shared. In this case, when N RS patterns for the B-MRS (or an antenna port of a BRS are present in a reference transmission unit, RS patterns for the C-MRS (or an antenna port of the C-MRS) may be defined as M (where M<N) RS patterns which are determined according to a preset rule having a cell identifier (ID) as an input value among the N RS patterns for the BRS.

In this case, M may be 1 or 2.

When indexes of the RS patterns for the B-MRS are present, indexes of the remaining RS patterns other than the RS patterns used for the C-MRS may be re-ordered (or re-indexed).

Figure 18:
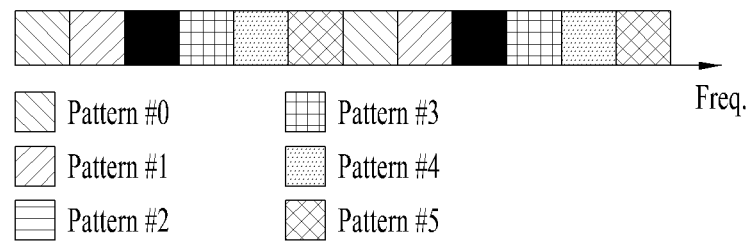
FIG. 18 is a diagram illustrating RS patterns for a B-MRS distinguished by FDM in a specific symbol according to the present invention.

FIG. 18 is a diagram illustrating RS patterns for a B-MRS distinguished by FDM in a specific symbol according to the present invention.

As illustrated in FIG. 18, the RS patterns for the B-MRS may have RS patterns distinguished by FDM in a specific symbol. It may be favorable to distinguish between RS patterns by interlaced frequency division multiple access (IFDMA) according to a comb type in a procedure of searching for an Rx beam of the UE. In other words, in the case of the comb type, the same signal is repeatedly transmitted on the time axis. The UE may compare Rx sensitivity of repeated signals by changing an Rx BF scheme with respect to the repeated signals.

In this case, RS patterns of the C-MRS may occupy a part of the above-described RS patterns of the B-MRS. The RS patterns for the C-MRS may be determined by applying an offset of a resource location on the frequency axis according to a cell ID value in order to avoid interference between adjacent cells.

Figure 19:
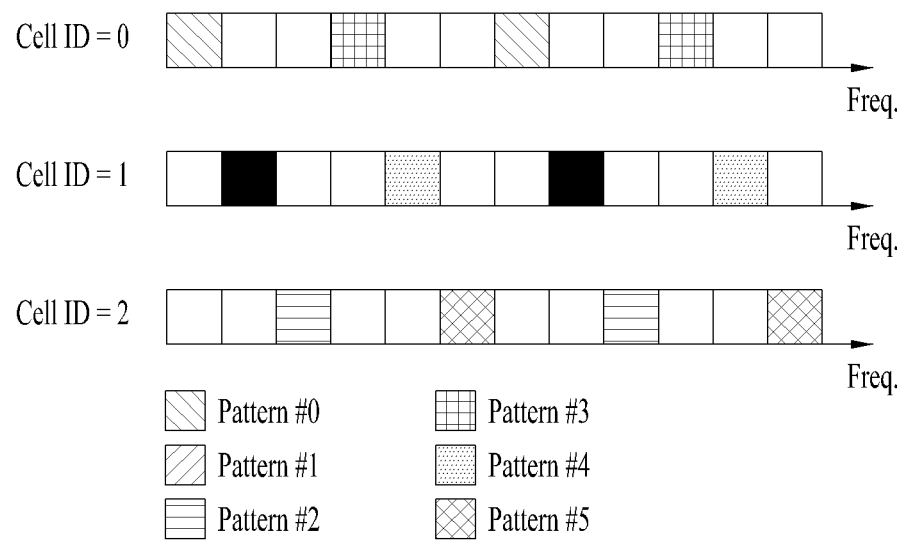
FIG. 19 is a diagram schematically illustrating an example in which two of 6 RS patterns of FIG. 18 are used as RS patterns for a C-MRS according to the present invention.

FIG. 19 is a diagram schematically illustrating an example in which two of 6 RS patterns of FIG. 18 are used as RS patterns for a C-MRS according to the present invention.

As illustrated in FIG. 19, an offset of the two RS patterns for the C-MRS on the frequency axis may differ according to cell ID.

In this case, when a plurality of RS patterns is allocated to the C-MRS, each RS pattern may be configured for the same antenna port or for different antenna ports. For example, different antenna ports may be configured (or allocated) for respective RS patterns.

The 12th DL measurement method may be applied in combination with other proposed methods of the present invention unless there is conflict therebetween.

3.1.13. 13th DL Measurement Method

When the eNB transmits a B-MRS as one type of DL RS for RRM (hereinafter, a measurement RS or MRS), the eNB may inform the UE of information regarding a B-MRS sequence which is to be detected and measured. Specifically, the eNB may inform the UE of beam group ID information (e.g., 0, 1, . . . , L−1) through a broadcast channel (e.g., PBCH) or system information and the UE may perform detection and measurement of (a total of L) B-MRS sequences having each of L combinations of a cell ID and a beam group ID as a seed value.

If the eNB informs the UE of the number of beam groups, the UE may derive the beam group ID information according to an implicit rule.

The value of L may be determined by the eNB in the range between 1 and $L_{MAX}$, wherein $L_{MAX}$ may be a fixed value.

In the NR system to which the present invention is applicable, a cell may include a plurality of TRPs and each TRP may operate one or more analog beams.

If the B-MRS has a sequence based on a BRS ID for distinguishing between BRSs in a cell, the number of B-MRS sequences to be measured by the UE for beam selection may be excessively large in some cases. For example, when 100 TRPs are present in a cell and B-MRS sequences transmitted by respective TRPs are distinguished, the UE should be capable of simultaneously detecting and measuring the 100 B-MRSs. If there are a large number of B-MRS sequences which are simultaneously detected, implementation complexity of the UE may greatly increase.

Therefore, it may be more efficient to allocate B-MRS sequences which are distinguished within a local region in which the UE is capable of performing detection and measurement rather than to allocate B-MRS sequences for distinguishing between all beams (or TRPs) in the cell.

For example, the eNB may allocate L B-MRS sequences corresponding to combinations of a cell ID and L beam group IDs for transmission of all N B-MRSs. If N>L, some B-MRS sequences may be reused.

As a method for this purpose, the eNB may inform the UE of beam group ID information (e.g., 0, 1, . . . , L−1) through the PBCH or the system information and the UE may perform detection and measurement of (a total of L) B-MRS sequences having each of L combinations of the cell ID and the beam group IDs as a seed value.

The 13th DL measurement method may be applied in combination with other proposed methods of the present invention unless there is conflict therebetween.

3.1.14. 14th DL Measurement Method

When the eNB transmits the B-MRS as one type of a DL RS for RRM (hereinafter, a measurement RS or an MRS), the eNB may transmit a first type (Type I) B-MRS and a second type (Type II) B-MRS. In this case, one first type B-MRS may have a correspondence relationship with a specific second type B-MRS group (i.e., a plurality of second type B-MRSs).

This correspondence relationship may be preset or may be transmitted by the eNB to the UE through a broadcast channel (e.g., PBCH) or system information.

A time and/or frequency resource in which the second type B-MRS within a specific second type B-MRS group is transmitted may be derived from a time and/or frequency resource in which the first type B-MRS is transmitted.

A sequence of the second type B-MRS within a specific second type B-MRS group may be derived from a sequence (or resource) of the first type B-MRS.

If beams applied to each B-MRS in the specific second type B-MRS group are present, a combined type of the beams may be applied to the first type B-MRS.

The UE may select an optimal first type B-MRS from the perspective of reception and then transmit a preamble for random access associated with the selected first type B-MRS. Next, the UE may attempt to perform detection under the assumption that second type B-MRSs in the second type B-MRS group corresponding to the selected first type B-MRS are a DM-RS candidate group for a random access response (RAR) upon detecting the RAR. Additionally, upon performing UL transmission or DL reception after detecting the RAR, the UE may perform UL transmission or DL reception under the assumption that there is scrambling corresponding (one-to-one) to the second type B-MRS, which is optimal from the perspective of reception from the second type B-MRS group.

Upon receiving random access related system information, the UE may use the first type B-MRS selected as the optimal first type B-MRS from the perspective of reception as the DM-RS or assume that scrambling corresponding (one-to-one) to the selected first type B-MRS has been applied to the SIB.

If a specific resource region in which a synchronization signal is transmitted is referred to as an SS block, a type A BRS may be transmitted within the SS block and a type B BRS may be transmitted in a resource region which is distinguished from the SS block at least on the time axis.

Herein, the second type BRS may be transmitted together with an RAR (or UE-common DL control signal) and the second type BRS may be used as a DM-RS for receiving the RAR (or UE-common DL control signal).

As described above, a cell may include a plurality of TRPs and each TRP may operate one or more analog beams. That is, a plurality of beams may be present in a specific cell.

In this case, if the UE performs measurement for a plurality of beams only through a single step (e.g., 1-step), this may excessively raise implementation complexity of the UE.

Accordingly, in the present invention, the UE operates in two steps. In the first step, the UE searches for an optimal beam group from the perspective of reception and, in the second step, the UE again searches for an optimal beam among a plurality of beams in a corresponding beam group direction from the perspective of reception. As a configuration supporting the above operation, a B-MRS (third type B-MRS) for selecting a beam group and a B-MRS (fourth type B-MRS) for selecting a beam should be introduced.

More specifically, the third type B-MRS may have a correspondence relationship with a plurality of fourth type B-MRSs and the correspondence relationship may include a correspondence relationship in terms of time and frequency resources and/or sequences.

The UE may perform two-stage beam detection using the third type B-MRS and the fourth type B-MRS and use the B-MRSs for additional usage. For example, the UE may select an optimal beam group using the third type B-MRS and then performs a random access (or RACH) procedure associated with the next corresponding beam group. Next, the UE selects an optimal beam using the fourth type B-MRS and then perform data reception and transmission associated with a corresponding beam. In the data transmission and reception operation associated with the optimal beam, scrambling applied to the data may be determined based on a beam ID of the corresponding beam.

The 14th DL measurement method may be applied in combination with other proposed methods of the present invention unless there is conflict therebetween.

3.1.15. 15th DL Measurement Method

If a UE (group) specific BW is configured for a specific UE, the eNB may configure UE (group) specific MRS configuration information including one or more of the following information for the UE with respect to a serving cell and/or neighbor cell(s).

(1) Information about a frequency resource that the UE is to measure

BW that the UE is to measure (hereinafter, measurement BW)

Measurement BW and location information on the frequency axis in a system band of the measurement BW (2) Information about a time resource that the UE is to measure A time interval in which the UE can expect that an MRS will be detected (hereinafter, a measurement window)

A period of the measurement window and an offset value on the time axis (3) MRS type For example, an MRS type may be a combination of one or more of the following DL signals.

Synchronization signal

An additional cell-specific or beam-specific DL RS for RRM

A DM-RS that can be shared by UEs in a PDCCH region (e.g., a shared/common DM-RS)

An RS usable for channel state information (CSI) measurement (hereinafter, a CSI-RS)

Herein, the MRS may refer to a DL signal for cell-specific or beam-specific RRM.

A UE (group) specific MRS for different UEs (groups) may be independently configured. For example, a period at which the MRS type and the MRS are transmitted may differ according to a UE (group) specific BW.

As a specific example, if a specific UE has a narrower UE BW than the BW of a total system band, it is assumed that the eNB may configure UE (group) specific BW for DL reception for the UE. In this case, the UE desirably performs RRM for neighbor cell(s) as well as RRM of a serving cell (a target cell for transmitting and receiving control information and/or data) even without changing a band configured by the eNB.

For this operation, the network should be capable of supporting MRS transmission for RRM for the serving cell and/or neighbor cell(s) in UE (group) specific BW configured for the UE.

As one method for this purpose, the eNB may transmit an MRS transmitted in the total system band. However, in consideration of network energy efficiency which is one of the main features of the NR system to which the present invention is applicable, it is desirable that the eNB configure a UE (group) specific MRS resource on which transmission can be performed in each UE specific BW.

Figure 20:
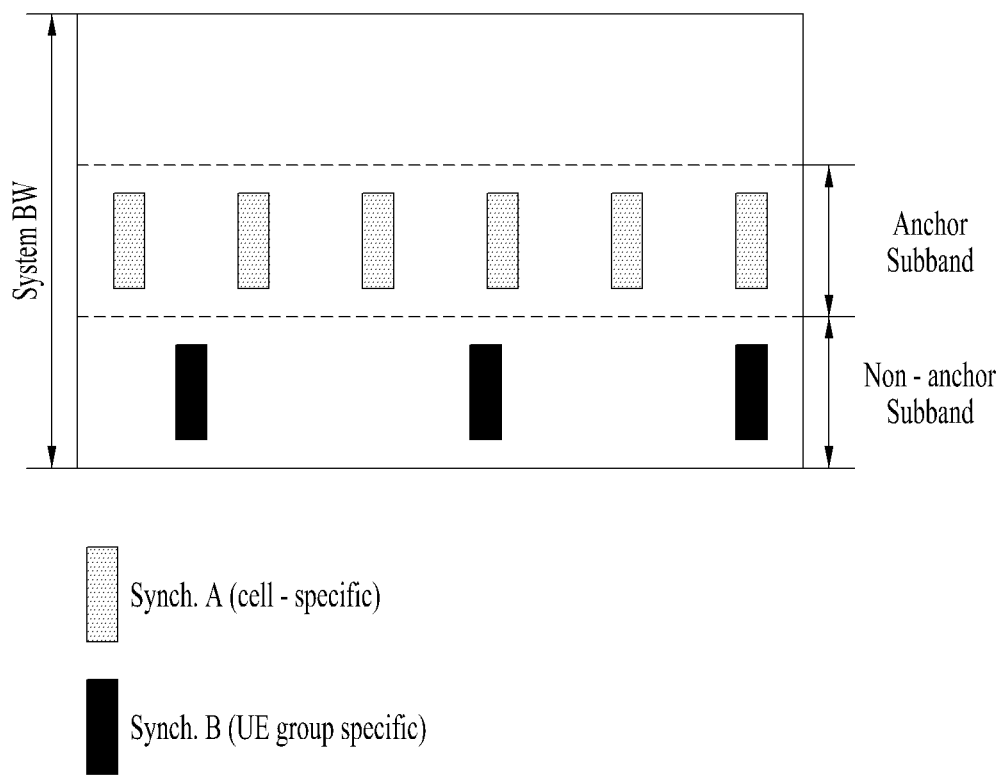
FIG. 20 is a diagram schematically illustrating a configuration in which a specific cell transmits a different synchronization signal in each band according to the present invention.

FIG. 20 is a diagram schematically illustrating a configuration in which a specific cell transmits a different synchronization signal in each band according to the present invention.

As illustrated in FIG. 20, a specific cell may transmit a synchronization signal (Synch. A) of a short period in an anchor band which is in charge of signal transmission for initial access of UEs in a system band and transmit a synchronization signal (Synch. B) of a long period in a non-anchor subband configured for data transmission and reception of a specific UE group.

UEs operating in the anchor subband may use Synch. A for RRM for a corresponding cell and UEs operating in the non-anchor subband may use Synch. B for RRM for a corresponding cell.

The 15th DL measurement method may be applied in combination with other proposed methods of the present invention unless there is conflict therebetween.

3.1.16. 16th DL Measurement Method

The eNB may inform the UE of information about a DL RS for RRM (hereinafter, measurement RS or MRS) on the frequency axis for a serving cell or neighbor cell(s). The information about the MRS on the frequency axis may include one or more of the following information.

(1) Information about PRB(s) in which the MRS in a system band is transmitted

Herein, the MRS may be a wideband MRS transmitted in a plurality of PRBs at the same timing.

(2) Information about (plural) measurement subbands in which MRS transmission in a system band is valid Herein, the eNB may configure a plurality of measurement subbands in the system band for the UE through a preset scheme, a higher-layer signal (e.g., RRC signaling), or system information. In this case, all or a part of a PRB region in each measurement subband may be determined to be an MRS transmission frequency resource region according to the preset scheme.

In this case, a time resource in each measurement subband may be equally or independently configured.

According to the above operation of the eNB, the UE may assume an available MRS resource for RRM through the following methods.

1) Case in which the eNB does not configure time and frequency resources on which RRM is to be performed The UE may perform RRM using a preset MRS resource (on time and frequency resources preagreed with the eNB).

The preset MRS resource may be all or a part of a DL signal used for cell selection/reselection in an RRC-idle mode.

If a subband (for DL reception) configured by the eNB for the UE does not include a preset frequency resource on which the MRS is transmitted, the UE may assume that a time gap (e.g., a measurement gap) for switching between RF bands is present prior to a time resource on which the MRS is transmitted.

2) If the eNB configures the time and frequency resources on which RRM is to be performed, the UE may perform one of the following methods according to a method in which the eNB transmits resource information regarding the MRS on the frequency axis.

The UE may determine that an MRS resource included in the time and frequency resources configured by the eNB is a valid resource and perform RRM using all or a part of the MRS resource.

The UE may determine that an MRS resource in a measurement subband included in the time and frequency resources configured by the eNB is a valid resource and perform RRM using a part or all of the MRS resource.

However, if different types of MRS resources are present in the time and frequency resources on which the UE is to perform RRM, the UE may perform RRM using all types of MRS resources or only a specific type of MRS having a higher priority.

However, if there is no MRS resource or measurement subband included in the time and frequency resources on which the UE is to perform RRM, the UE may perform RRM using a preset MRS resource (on time and frequency resources preagreed with the eNB).

In the above method, the eNB may inform the UE of information about time and frequency resources on which a DL RS for RRM is transmitted through a preset scheme, a higher-layer signal (e.g., RRC signaling), or system information.

The eNB may configure a resource for the UE such that RRM is performed on a frequency resource which hops over time.

In the above description, the UE in an RRC-idle mode may refer to a UE in a state in which the UE does not make a higher-layer connection (e.g., RRC connection) with the network.

The configuration for the MRS transmission resource for RRM may be a UE (or UE group) specific configuration and the configuration for a resource on which the UE is to perform RRM may be cell (or non-UE) specific configuration. In this case, the UE may perform RRM using the MRS resource included in all of resources indicated by the two configurations (i.e., the configuration for the MRS and the configuration for RRM).

More specifically, when a specific UE has a narrower UE BW than a BW of a total system band, the eNB may configure a subband for DL reception. In this case, it is desirable that the eNB support RRM in the subband configured for DL reception for the UE.

If a subband in which the UE receives DL data is different from a subband in which the UE performs RRM, the UE should change an RF BW thereof each time the UE performs RRM.

Such an operation of the UE may cause waste of a time resource according to a measurement gap configuration and data reception disconnection or traffic saturation in a corresponding subband while performing RRM.

Therefore, the present invention proposes a method of transmitting an MRS in a subband configured for the UE by the eNB as a method supporting RRM in a subband configured by the eNB for the UE having a narrower UE BW than the total system band.

In this case, the eNB may transmit a broadband MRS having a flexible frequency resource in terms of system. A part of the MRS may be transmitted to be included in a subband of the UE or the MRS may be transmitted in the unit of a plurality of measurement subbands so that at least one measurement subband is included in the subband of the UE.

The 16th DL measurement method may be applied in combination with other proposed methods of the present invention unless there is conflict therebetween.

3.1.17. 17th DL Measurement Method

The eNB may transmit a synchronization signal to which a beam sweeping operation is applied in N symbols (or time units) of a periodically repeated time interval and then the UE may calculate DL measurement (for cell selection) using one of the following methods.

(1) The UE may measure a received power value of the synchronization signal in each symbol in every time interval, acquire a time-axis average value (or a value to which time-axis filtering is applied) of the measurement values on a symbol-by-symbol basis, and use values exceeding a threshold value $T_0$ and/or values included in K-th values in order of size among the time-axis average values as DL measurement values.

If the number of the time-axis average values is plural, a single DL measurement value (e.g., cell-level RSRP) for a specific cell may be defined as a maximum value (or an added value, an average value, or a median value) of plural time-axis average values.

(2) The UE may measurement a received power value of the synchronization signal in each symbol in every time interval and set measurement values (in a corresponding time interval) which do not exceed the threshold value $T_0$ and/or values which are not included in a K-th value in order of size among the measurement values in respective symbols to 0. Then, the UE may acquire a time-axis average value (or a value to which time-axis filtering is applied) of the measurement values on a symbol-by-symbol basis and use the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(3) The UE may measure a received power value of the synchronization signal in each symbol of every time interval and set measurement values (in a corresponding time interval) which do not exceed the threshold value $T_0$ (or values which are not included a K-th value in order of size) among the measurement values on a symbol-by-symbol basis to 0. Then, the UE may acquire a time-axis average value (or a value to which time-axis filtering is applied) of the measurement values on a symbol-by-symbol basis and use values which are included in the K-th value in order of size (or values exceeding the threshold value $T_0$) among the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(4) The UE may measure a received power value of the synchronization signal in each symbol in every time interval and acquire a maximum value X (or an added value, an average value, or a median value) of values which exceed the threshold value $T_0$ and/or are included in a K-th value in order of size among the measurement values in respective symbols. Next, the UE may use a time-axis average value (or a value to which time-axis filtering is applied) of X as the DL measurement value.

In above-described configurations, the threshold value $T_0$ may be a preset value or a value configured for the UE by the eNB and may include $-\infty$ or 0 (i.e., all values may be applied as the threshold value $T_0$).

In addition, K may be a preset value or a value configured for the UE by the eNB.

In the above-described configuration, the beam sweeping operation may represent an operation of changing an analog beam direction (of each TXRU) with respect to a plurality of symbols (or time resources).

In the above-described configuration, the UE may assume that $N=N_0$, wherein $N_0$ is a preset value.

In the above description, the "time-axis average value (or value to which time-axis filtering is applied) of the measured values on a symbol-by-symbol basis" may mean a time-axis average value (or a value to which time-axis filtering is applied) of values measured in the same symbol index.

In the above-described configuration, "symbol" may be replaced with "time unit corresponding to a beam sweeping unit" or "time unit in which beams can be distinguished from the perspective of reception". For example, in the NR system to which the present invention is applicable, a synchronization block, which is a resource unit including a synchronization signal, a PBCH, and/or an MRS, is defined. When the eNB transmits a signal by applying the beam sweeping operation to the synchronization block, the above-described "symbol" may be replaced with "synchronization block".

More specifically, in the NR system to which the present invention is applicable, if the UE calculates the DL measurement value for cell measurement by measuring a received power of a DL signal to which the beam sweeping operation is applied in a plurality of symbols in a periodically repeated time interval, how received powers of the synchronization signal in the plural symbols (or for a plurality of beams), measured by the UE in every time interval, will be combined to derive RRM of a single cell level (cell-level RRM (e.g., RSRP)) should be determined.

In this case, a procedure of combining the measured received power values broadly includes two processes: (1) a time-axis filtering process and (2) a measurement value combination process for a plurality of plural symbols (or beams or beam sweeping indexes). The two processes may consider the following operations according to when the two processes are performed. A measurement value for a specific beam may mean a measurement value corresponding to combination(s) of specific {symbol, antenna port, sequence} resources.

1) Option 1
Measure a received power of a DL signal per beam in every time interval→apply time-axis filtering→derive a time-axis filtering value X for the received power measurement value per beam→combine X values for plural beams→perform single DL measurement (e.g., cell-level RSRP)

2) Option 2
Measure a received power of the DL signal per beam in every time interval→combine received power measurement values for plural beams→apply time-axis filtering→derive a time-axis filtering value Y for the combined received power measurement value→perform single DL measurement (e.g., cell-level RSRP)

In the above methods, the synchronization signal may be used as the DL signal for DL measurement to select a cell. When the UE determines targets to which time-axis filtering is applied among received power measurement values in every time interval or determines targets for combining measurement values for a plurality of beams, the UE may configure only values which exceed a specific threshold value and/or are included in an N-th value in order of size.

In the above operation, if a received power for a specific beam with respect to a DL signal that can be transmitted for a plurality of beams is excessively low, the UE may regard the beam having the excessively low received power as a non-existing beam and exclude the beam in a DL measurement process for cell selection, thereby acquiring a more accurate DL measurement value.

The 17th DL measurement method may be applied in combination with other proposed methods of the present invention unless there is conflict therebetween.

3.1.18. 18th DL Measurement Method

If the eNB applies a beam sweeping operation to N symbols (or time units) in a periodically repeated time interval and transmits an MRS having M antenna ports which are distinguished by an orthogonal resource in each symbol with respect to L sequences, the UE may acquire DL measurement values (for cell selection) using one of the following methods.

(1) The UE may measure received power values of the MRSs with respect to respective combinations of {sequence, symbol, antenna port} in every time interval, acquire time-axis average values (or values to which time-axis filtering is applied) of the measurement values with respect to respective combinations, and then use values which exceed a threshold value $T_0$ and/or values which are included in a K-th value in order of size among the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(2) The UE may measure added (or average) received power values of the MRSs for antenna ports with respect to respective combinations of {sequence, symbol} in every time interval, acquire time-axis average values (or values to which time-axis filtering is applied) of the measurement values with respect to respective combinations, and then use values which exceed a threshold value $T_0$ and/or values which are included in a K-th value in order of size among the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(3) The UE may measure added (or average) received power values of the MRSs for sequences with respect to respective combinations of {symbol, antenna port} in every time interval, acquire time-axis average values (or values to which time-axis filtering is applied) of the measurement values with respect to respective combinations, and then use values which exceed a threshold value $T_0$ and/or values which are included in a K-th value in order of size among the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(4) The UE may measure received power values of the MRSs with respect to respective combinations of {sequence, symbol, antenna port} in every time interval, set measurement values which do not exceed a threshold value $T_0$ and/or values which are not included in a K-th value in order of size (in a corresponding duration) among the measurement values with respect to respective combinations to 0, acquire time-axis average values (or values to which time-axis filtering is applied) of the measurement values with respect to respective combinations, and then use the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(5) The UE may measure added (or average) received power values of the MRSs for antenna ports with respect to respective combinations of {sequence, symbol} in every time interval, set measurement values which do not exceed a threshold value $T_0$ and/or values which are not included in a K-th value in order of size (in a corresponding duration) among the measurement values with respect to respective combinations to 0, acquire time-axis average values (or values to which time-axis filtering is applied) of the measurement values with respect to respective combinations, and then use the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(6) The UE may measure added (or average) received power values of the MRSs for sequences with respect to respective combinations of {symbol, antenna port} in every time interval, set measurement values which do not exceed a threshold value $T_0$ and/or values which are not included in a K-th value in order of size (in a corresponding duration) among the measurement values with respect to respective combinations to 0, acquire time-axis average values (or values to which time-axis filtering is applied) of the measurement values with respect to respective combinations, and then use the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(7) The UE may measure received power values of the MRSs with respect to respective combinations of {sequence, symbol, antenna port} in every time interval, set measurement values which do not exceed a threshold value $T_0$ (or values which are not included in a K-th value in order of size) (in a corresponding duration) among the measurement values with respect to respective combinations to 0, acquire time-axis average values (or values to which time-axis filtering is applied) of the measurement values with respect to respective combinations, and then use values which are included in the k-th value in order of size (or values exceeding the threshold value $T_0$) among the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(8) The UE may measure added (or average) received power values of the MRSs for antenna ports with respect to respective combinations of {sequence, symbol} in every time interval, set measurement values which do not exceed a threshold value $T_0$ (or values which are not included in a K-th value in order of size) (in a corresponding duration) among the measurement values with respect to respective combinations to 0, acquire time-axis average values (or values to which time-axis filtering is applied) of the measurement values with respect to respective combinations, and then use values which are included in the k-th value in order of size (or values exceeding the threshold value $T_0$) among the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(9) The UE may measure added (or average) received power values of the MRSs for sequences with respect to respective combinations of {symbol, antenna port} in every time interval, set measurement values which do not exceed a threshold value $T_0$ (or values which are not included in a K-th value in order of size) (in a corresponding duration) among the measurement values with respect to respective combinations to 0, acquire time-axis average values (or values to which time-axis filtering is applied) of the measurement values with respect to respective combinations, and then use values which are included in the k-th value in order of size (or values exceeding the threshold value $T_0$) among the time-axis average values as the DL measurement values.

If the number of the time-axis average values is plural, a single DL measurement value (e.g., cell-level RSRP) for a specific cell may be defined as a maximum value (or an added value, an average value, or a median value) of the plural time-axis average values.

(10) The UE may measure received power values of the MRSs with respect to respective combinations of {sequence, symbol, antenna port} in every time interval, acquire a maximum value X (or an added value, an average value, or a median value) of values which exceed a threshold value $T_0$ and/or values which are included in a K-th value in order of size among the measurement values with respect to respective combinations, and then use a time-axis average value (or a value to which time-axis filtering is applied) of X as the DL measurement value.

(11) The UE may measure added (or average) received power values of the MRSs for antenna ports with respect to respective combinations of {sequence, symbol} in every time interval, acquire a maximum value X (or an added value, an average value, or a median value) of values which exceed a threshold value $T_0$ and/or values which are included in a K-th value in order of size among the measurement values with respect to respective combinations, and then use a time-axis average value (or a value to which time-axis filtering is applied) of X as the DL measurement value.

(12) The UE may measure added (or average) received power values of the MRSs for sequences with respect to respective combinations of {symbol, antenna port} in every time interval, acquire a maximum value X (or an added value, an average value, or a median value) of values which exceed a threshold value $T_0$ and/or values which are included in a K-th value in order of size among the measurement values with respect to respective combinations, and then use a time-axis average value (or a value to which time-axis filtering is applied) of X as the DL measurement value.

(13) The UE may measure received power values of the MRSs with respect to respective combinations of {symbol, antenna port} for each sequence in every time interval, acquire time-axis average values (or values to which time-axis filtering is applied) of the measurement values with respect to respective combinations, calculate a maximum value X (or, an added value, an average value, or a median value) of values which exceed a threshold value $T_0$ and/or values which are included in a K-th value in order of size among the time-axis average values with respect to respective combinations, and then use a maximum value (or values included in an L-th value in order of size) among maximum values X for respective sequences as the DL measurement value.

If the number of the X values is plural, a single DL measurement value (e.g., cell-level RSRP) for a specific cell may be defined as a maximum value (or an added value, an average value, or a median value) of the plural X values.

(14) The UE may measure added (or average) received power values of the MRSs for antenna ports in respective symbols with respect to each sequence in every time interval, acquire time-axis average values X (or values to which time-axis filtering is applied) of the measurement values in respective symbols, calculate a maximum value X (or an added value, an average value, or a median value) of values which exceed a threshold value $T_0$ and/or values which are included in a K-th value in order of size among the time-axis average values, and then use a maximum value (or values included in an L-th value in order of size) among maximum values X for respective sequences as the DL measurement value.

If the number of the X values is plural, a single DL measurement value (e.g., cell-level RSRP) for a specific cell may be defined as a maximum value (or an added value, an average value, or a median value) of the plural X values.

(15) The UE may measure received power values of the MRSs with respect to respective combinations of {symbol, antenna port} for each sequence in every time interval, set measurement values which do not exceed a threshold value $T_0$ and/or values which are not included in a K-th value in order of size (in a corresponding duration) among the measurement values with respect to respective combinations to 0, acquire time-axis average values (or values to which time-axis filtering is applied) of the measurement values with respect to respective combinations, calculate a maximum value (or an added value, an average value, or a median value) X of the time-axis average values, and then use a maximum value (or values included in an L-th value in order of size) among maximum values X for respective sequences as the DL measurement value.

If the number of the time-axis average values is plural, a single DL measurement value (e.g., cell-level RSRP) for a specific cell may be defined as a maximum value (or an added value, an average value, or a median value) of the plural time-axis average values.

(16) The UE may measure added (or average) received power values of the MRSs for antenna ports in respective symbols with respect to each sequence in every time interval, set measurement values which do not exceed a threshold value $T_0$ and/or values which are not included in a K-th value in order of size (in a corresponding duration) among the measurement values in respective symbols to 0, acquire time-axis average values (or values to which time-axis filtering is applied) of the measurement values in respective combinations, calculate a maximum value X (or an added value, an average value, or a median value) of the measurement values in respective symbols, and then use a maximum value (or values included in an L-th value in order of size) among maximum values X for respective sequences as the DL measurement value.

If the number of the time-axis average values is plural, a single DL measurement value (e.g., cell-level RSRP) for a specific cell may be defined as a maximum value (or an added value, an average value, or a median value) of the plural time-axis average values.

(17) The UE may measure added (or average) received power values of the MRSs with respect to respective combinations of {symbol, antenna port} for each sequence in every time interval, set measurement values which do not exceed a threshold value $T_0$ (or values which are not included in a K-th value in order of size) (in a corresponding duration) among the measurement values with respect to respective combinations to 0, acquire time-axis average values (or values to which time-axis filtering is applied) of the measurement values with respect to respective combinations, calculate a maximum value (or an added value, an average value, or a median value) of the measurement values which do not exceed a threshold value $T_0$ (or values which are not included in a K-th value in order of size) among the time-axis average values, and then use a maximum value (or values included in an L-th value in order of size) among maximum values X for respective sequences as the DL measurement value.

If the number of the time-axis average values is plural, a single DL measurement value (e.g., cell-level RSRP) for a specific cell may be defined as a maximum value (or an added value, an average value, or a median value) of the plural time-axis average values.

(18) The UE may measure added (or average) received power values of the MRSs for antenna ports in respective symbols with respect to each sequence in every time interval, set measurement values which do not exceed a threshold value $T_0$ (or values which are not included in a K-th value in order of size) (in a corresponding duration) among the measurement values in respective symbols to 0, acquire time-axis average values (or values to which time-axis filtering is applied) of the measurement values in respective combinations, calculate a maximum value (or an added value, an average value, or a median value) of the measurement values which are not included in a K-th value in order of size (or values which do not exceed a threshold value $T_0$) among the time-axis average values, and then use a maximum value (or values included in an L-th value in order of size) among maximum values X for respective sequences as the DL measurement value.

If the number of the time-axis average values is plural, a single DL measurement value (e.g., cell-level RSRP) for a specific cell may be defined as a maximum value (or an added value, an average value, or a median value) of the plural time-axis average values.

(19) The UE may measure received power values of the MRSs with respect to respective combinations of {symbol, antenna port} for each sequence in every time interval, acquire a maximum value (or an added value, an average value, or a median value) of values which exceed a threshold value $T_0$ and/or values which are included in a K-th value in order of size among the measurement values with respect to respective combinations, calculate a time-axis average value (or a value to which time-axis filtering is applied) of X, and then use a maximum value (or values included in an L-th value in order of size) among maximum values X for respective sequences as the DL measurement value.

If the number of the X values is plural, a single DL measurement value (e.g., cell-level RSRP) for a specific cell may be defined as a maximum value (or an added value, an average value, or a median value) of the plural X values.

(20) The UE may measure added (or average) received power values of the MRSs for antenna ports with respect to respective combinations of {symbol, antenna port} for each sequence in every time interval, acquire a maximum value (or an added value, an average value, or a median value) of values which exceed a threshold value $T_0$ and/or values which are included in a K-th value in order of size among the measurement values with respect to respective combinations, calculate a time-axis average value (or a value to which time-axis filtering is applied) of X, and then use a maximum value (or values included in an L-th value in order of size) among maximum values X for respective sequences as the DL measurement value.

If the number of the X values is plural, a single DL measurement value (e.g., cell-level RSRP) for a specific cell may be defined as a maximum value (or an added value, an average value, or a median value) of the plural X values.

In the above description, the threshold value $T_0$ may be a preset value or a value configured for the UE by the eNB and may include $-\infty$ or 0.

In addition, K may be a preset value or a value configured for the UE by the eNB.

Herein, the beam sweeping operation represents an operation of changing an analog beam direction (of each TXRU) with respect to a plurality of symbols (or time resources).

A time interval in which the MRS is transmitted may be derived from a timing at which the synchronization signal is transmitted.

In the above description, the UE may assume that N=N0, M=$M_0$, and L=$L_0$, wherein $N_0$, $M_0$, and $L_0$ may be preset values.

In the above-described DL measurement methods, (3), (4), (5), and (6) may be used for the purpose of selecting a TRP/beam.

In the above description, the symbol may imply a symbol index.

In the above description, "symbol" may be replaced with "time unit corresponding to a beam sweeping unit" or "time unit in which beams can be distinguished from the perspective of reception". For example, in the NR system to which the present invention is applicable, a synchronization block, which is a resource unit including a synchronization signal, a PBCH, and/or an MRS, is defined. When the eNB transmits a signal by applying the beam sweeping operation to the synchronization block, "symbol" may be replaced with "synchronization block".

More specifically, in the NR system to which the present invention is applicable, if the UE calculates the DL measurement value for cell measurement by measuring a received power of a DL signal to which the beam sweeping operation is applied in a plurality of symbols in a periodically repeated time interval, how received powers of the synchronization signals in the plural symbols (or for a plurality of beams) measured by the UE in every time interval will be combined to derive a single-cell RRM (cell-level RRM (e.g., RSRP)) should be determined. In this case, a procedure of combining the measured received power values broadly includes two processes: (1) a time-axis filtering process and (2) a measurement value combination process for a plurality of plural symbols (or beams or beam sweeping indexes).

The following operations may be considered depending on when the above two processes are performed. A measurement value for a specific beam may imply a measurement value corresponding to specific resource combination(s) of {symbol, antenna port, sequence}.

1) Option 1

Measure a received power of a DL signal per beam in every time interval→apply time-axis filtering→derive a time-axis filtering value X for the received power measurement value per beam→combine X values for plural beams→perform single DL measurement (e.g., cell-level RSRP)

2) Option 2

Measure a received power of the DL signal per beam in every time interval→combine received power measurement values for plural beams→apply time-axis filtering→derive a time-axis filtering value Y for the combined received power measurement value→perform single DL measurement (e.g., cell-level RSRP)

The present invention proposes a method of using an MRS. which can be distinguished by a symbol, an antenna port, or a sequence, as the DL signal for DL measurement to select a cell and determining, as target values, values which exceed a specific threshold value and/or values which are included in an N-th value in order of size when the UE determines target values to which time-axis filtering is applied among received power measurement values in every time interval or target values which are to be combined with measurement values for a plurality of beams.

In the above operation, if a received power for a specific beam with respect to a DL signal that can be transmitted for a plurality of beams is excessively low, the UE may regard the beam having the excessively low received power as an non-existing beam and exclude the beam in a DL measurement process for cell selection, thereby acquiring a more accurate DL measurement value.

The 18th DL measurement method may be applied in combination with other proposed methods of the present invention unless there is conflict therebetween.

3.1.19. 19th DL Measurement Method

The eNB may transmit a DL signal in beams corresponding to a plurality of beams in a periodically repeated measurement interval and the UE may acquire a DL measurement value (for cell selection) using the DL signal of each beam according to the following procedures.

(1) The UE measures a received power value of the DL signal per beam (in every measurement interval).

(2) The UE calculates a cell-level received power value (in every measurement interval) using one of the following methods.

A maximum value of received power values of the DL signals for respective beams

An average of received power values of the DL signals for respective beams

A total sum of received power values of the DL signals for respective beams (3) The UE calculates a cell-level DL measurement value by applying time-axis filtering (or time-axis averaging) to the cell-level received power value Herein, the beams may imply channels divided into analog beams or digital beams and the DL signals for respective beams may be distinguished by a time/frequency/sequence resource.

As in the method corresponding to (2) described above, the UE may select the received power values of the DL signals for respective beams and use the selected received power values to calculate the cell-level reception power value. To this end, the UE may select values exceeding a specific threshold value and/or values included in a K-th value in order of size among the received power values of the DL signals for respective beams.

The threshold value and K value may be preset values or values configured by the eNB through system information or a higher-layer signal.

In the NR system to which the present invention is applicable, when the DL signal is transmitted per beam with respect to a plurality of beams in a periodically repeated measurement interval, the UE may derive a single DL measurement value (e.g., cell-level RSRP) for cell selection by combining the received power values of the DL signals measured with respect to the plural beams.

According to the above-described procedure, the UE measures a received power value of a DL signal per beam with respect to a plurality of beams in every measurement interval, adds the received power values the DL signals measured for the plural beams, and calculates a single cell-level reception power value. Next, the UE applies time-axis filtering (or time-axis averaging) to the cell-level reception power value to acquire a DL measurement value for cell selection.

If the UE requires only DL measurement for cell selection through the above operation, the UE does not need to store a measurement value per beam.

The 19th DL measurement method may be applied in combination with other proposed methods of the present invention unless there is conflict therebetween.

3.1.20. 20th DL Measurement Method

The eNB may transmit a DL signal per beam with respect to a plurality of beams in a periodically repeated measurement interval and the UE may acquire a DL measurement value (for cell selection) using the DL signal of each beam according to the following procedures.

(1) The UE measures a received power value of the DL signal per beam (in every measurement interval).

(2) The UE calculates an average received power value of the DL signal per beam by applying time-axis filtering (or time-axis averaging) to the received power value of the DL signal per beam.

(3) The UE calculates a cell-level reception power value using one of the following methods.

A maximum value of average received power values of the DL signals for respective beams An average of average received power values of the DL signals for respective beams A total sum of average received power values of the DL signals for respective beams Herein, the beams may imply channels divided into analog beams or digital beams and the DL signals for respective beams may be distinguished by a time/frequency/sequence resource.

As in the method corresponding to (3) described above, the UE may select the average received power values of the DL signals for respective beams and use the selected average received power values to calculate the cell-level reception power value. To this end, the UE may select values exceeding a specific threshold value and/or values included in a K-th value in order of size among the average received power values of the DL signals for respective beams.

The threshold value and K value may be preset values or values configured by the eNB through system information or a higher-layer signal.

In the NR system to which the present invention is applicable, when the DL signal is transmitted per beam with respect to a plurality of beams in a periodically repeated measurement interval, the UE may derive a single DL measurement value (e.g., cell-level RSRP) for cell selection by combining the received power values of the DL signals measured with respect to the plural beams.

According to the above-described procedure, the UE measures a received power value of a DL signal per beam with respect to a plurality of beams in every measurement interval and acquires average received power values of the DL signals for respective beams by applying time-axis filtering (or time-axis averaging) to the received power values of the DL signals for respective beams. Next, the UE combines the average received power values of the DL signals for the respective beams and acquires a single DL measurement value for cell selection.

According to the above procedure, if the UE needs to perform DL measurement for cell selection and measure average power information per beam, the UE may integrate the two measurement processes into one without separately performing the two measurement processes.

The 20th DL measurement method may be applied in combination with other proposed methods of the present invention unless there is conflict therebetween.

3.1.21. 21st DL Measurement Method

When the eNB transmits a DL signal per beam with respect to a plurality of beams in a periodically repeated measurement interval and performs DL measurement using the DL signal per beam, the UE may calculate the number of average valid beams using one of the following options.

(1) Option 1
Calculate the number of values exceeding a specific threshold value among received power values of DL signals for respective beams in every measurement interval→calculate the number of average valid beams as an average of N (2) Option 2
Calculate average received power values of DL signals for respective beams in a plurality of measurement intervals→calculate the number of average valid beams as the number of values exceeding a specific threshold value among the average received power values of the DL signals for respective beams Next, the UE may report the number of the average valid beams to the eNB.

Herein, the beams may imply channels divided into analog beams or digital beams and the DL signals for respective beams may be distinguished by a time/frequency/sequence resource.

The threshold value and K value may be preset values or values configured by the eNB through system information or a higher-layer signal.

In the NR system to which the present invention is applicable, one cell may operate a plurality of beams and the number of beams may differ according to a cell. When the UE performs HO to a specific cell, HO target cells having many beams capable of supporting a service to the UE may be favorable for the UE.

Therefore, when the UE according to the present invention reports an RRM result for neighbor cells to a serving cell thereof, the UE may also report the number of beams supported by each cell. However, since a beam having very low received power is meaningless for the UE, the UE may determine that the beam is valid only when an (average) received power value of a DL signal corresponding to the beam is above a predetermined size.

The 21st DL measurement method may be applied in combination with other proposed methods of the present invention unless there is conflict therebetween.

3.1.22. 22nd DL Measurement Method

If the eNB configures, for the UE, a transmission resource and a transmission period of a cell-specific (periodic) DL signal (hereinafter, an X-RS) (transmitted based on a cell ID and/or transmitted to all UEs in a cell) through system information or a higher-layer signal (or a preset scheme), the UE may use the X-RS resource in a reception band thereof for one or more of the following usages:

(1) RRM
(2) radio link failure (RLF) determination
(3) time/frequency offset tracking
(4) synchronization If a control region (or a PBCH transmission region) configured to share a DM-RS between UEs overlaps with a transmission resource of the X-RS, the UE may configure a DM-RS of the control region (or PBCH transmission region) as follows.

1) The UE uses an X-RS transmission resource included in the control region (or PBCH transmission region) as the DM-RS.

2) The UE uses all C-RS transmission resources having a QCL relationship with the X-RS transmission resource included in the control region (or PBCH transmission region) as the DM-RS.

3) The UE uses all X-RS resources in the same scheduling unit as the control region (or PBCH transmission region) and all X-RS resources in a reception band of the UE as the DM-RS.

The eNB may inform the UE of whether the X-RS can be used as the DM-RS in a specific control region (or PBCH transmission region).

The eNB may indicate a usage of the X-RS (in each frequency resource) to the UE through system information, a higher-layer signal, or DCI. For example, the eNB may indicate a plurality of usages among usages for RRM, RLF determination, time/frequency offset tracking, synchronization, a DM-RS for a control region, and CSI measurement (in each frequency resource) with respect to the cell-specific DL signal.

The UE may assume that the X-RS supports at least an RRM function.

In the present invention, the control region may imply a time and frequency resource region in which a control signal is transmitted.

The cell-specific (periodic) DL signal may have a structure which is repeatedly transmitted in N (where N≥2) consecutive symbols for time/frequency offset tracking performance.

In the NR system to which the present invention is applicable, an always-transmitted RS such as a cell-specific reference signal (CRS) of an LTE system is excluded for network efficiency. However, even in the NR system to which the present invention is applicable, introduction of a cell-specific DL signal (hereinafter, an X-RS) supporting various functions such as RRM, RLF determination, and a DM-RS in a UE-common control region in a cell may be desirable in terms of RS transmission overhead.

Since a resource for RRM should always be present, the UE may determine that additional functions such as RLF determination and the DM-RS in the control region are supported according to a specific condition under the assumption that the X-RS basically supports an RRM function.

Alternatively, the eNB may directly inform the UE of a usage of the X-RS (in each frequency resource).

As a modification example, the eNB may configure a periodic control region in which DM-RS transmission is guaranteed for the UE and the UE may perform RLF determination, RRM, and/or time/frequency offset tracking based on the DM-RS in the periodic control region.

The 22nd DL measurement method may be applied in combination with other proposed methods of the present invention unless there is conflict therebetween.

3.1.23. 23rd DL Measurement Method

If the eNB configures a plurality of DL RS resource groups as a DL signal used to perform DL measurement (or RRM) for cell selection, the MRS may include different DL RS resources having different numerologies.

For example, the eNB may configure a PBCH DM-RS and a tracking RS as MRSs. Although the PBCH DM-RS may have a numerology different from data numerology for initial access, the tracking RS may have the same numerology as the data numerology to easily perform rate matching with data.

The 23rd DL measurement method may be applied in combination with other proposed methods of the present invention unless there is conflict therebetween.

3.1.24. 24th DL Measurement Method

The eNB may transmit a DL measurement RS for which a sequence and/or an antenna port resource is defined for each cell (hereinafter, MRS-A) in the same time unit in which each synchronization signal block (SS block) is transmitted and the UE may use the MRS-A for the purpose of performing cell-level RRM in an RRC-idle mode and/or an RRC-connected mode.

Herein, if a plurality of SS blocks having different (analog) beam directions is transmitted, plural MRS-As may be defined/transmitted for each cell.

Cell-level RRM may mean a DL measurement value (or RRM value) defined for a cell as a single value.

The MRS-A may have one or more of the following features.

- If the eNB additionally configures the MRS-A, the MRS-A may be transmitted even in a time interval in which the SS block is not transmitted.
- The MRS-A may be transmitted in a wider band than a band defined for the SS block on the frequency axis.
- The UE may assume that antenna ports of the MRS-A have the same analog beam.
- The UE may assume that the MRS-A has the same (analog) beam or the same coverage as the synchronization signal (in each time unit corresponding to the SS block).
- The UE may use all or some resources of the MRS-A to demodulate a PBCH or a DL control channel.
- The UE may expect that the maximum number of antenna ports of the MRS-A (in each time unit corresponding to the SS block) will be 2.
- An offset on the frequency axis according to a cell ID value may be applied to a resource location of the MRS-A on the frequency axis.
- The UE may assume that a QCL relationship is not established between MRS-A(s) corresponding to distinguishable SS block(s) (in terms of an analog beam).

Figure 21:
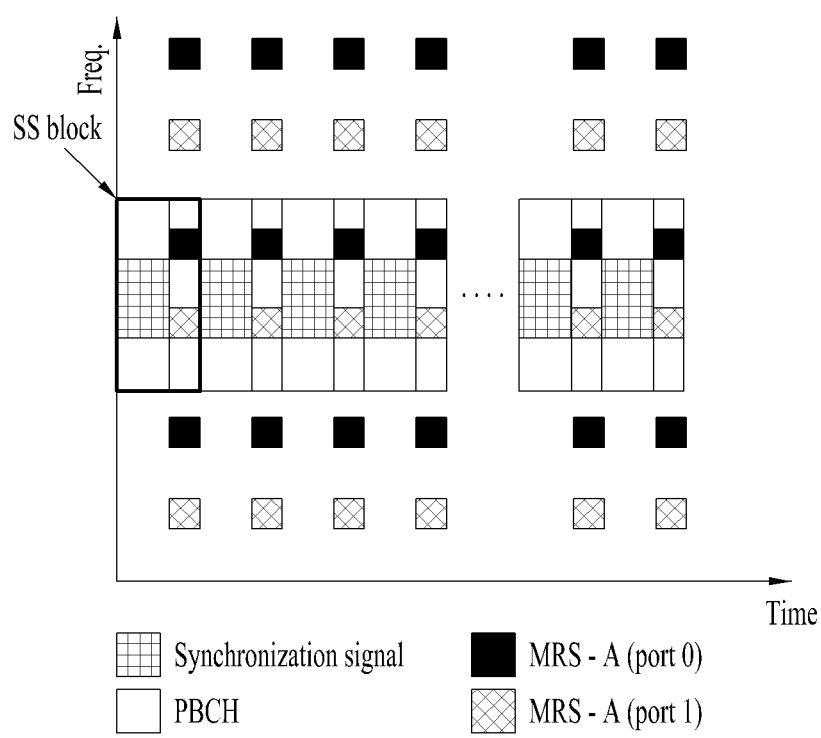
FIG. 21 is a diagram schematically illustrating an operation of transmitting a 2-port MRS-A passing through each synchronization signal block on the frequency axis when an eNB transmits N synchronization signal blocks by applying a beam sweeping operation.

FIG. 21 is a diagram schematically illustrating an operation of transmitting a 2-port MRS-A passing through each SS block on the frequency axis when the eNB transmits N SS blocks by applying a beam sweeping operation.

In FIG. 21, resources included in an SS block band among MRS-A resources or the total MRS resources transmitted in the same time unit as an SS block may be used to demodulate a PBCH in the SS block.

In this case, the MRS-A may have different RS patterns according to an operating frequency band. For example, the MRS-A of a band below 6 GHz may be used for time/frequency tracking. Then, the band below 6 GHz may apply a different RS pattern from an RS pattern of the MRS-A of a band above 6 GHz.

If the MRS-A is transmitted in a plurality of (analog) beam directions, cell-level RRM may be calculated by combining multi-beam measurement performed using the MRS-A. The following equation indicates a configuration according to the above operation.

$$P_{avg} = \frac{1}{T} \sum_{t} \max_{i} P_i(t) \quad \text{[Equation 1]}$$

In Equation 1, P_avg represents a cell-level RRM value and P_i (n) represents a received power value of the MRS-A corresponding to an i-th beam direction (or SS block) at time t.

Additionally, the UE may measure received power of the MRS-A and/or the synchronization signal for a neighbor cell and report, for an HO procedure, index values of M best SS blocks having best power of the MRS-A and/or the synchronization signal (or index values of the MRS-A resource) to a serving cell thereof or an HO target cell. If the UE is handed over to a neighbor cell according to an HO operation, the neighbor cell and the UE may perform beam refinement to configure more refined analog beams than analog beam(s) corresponding to the reported M best SS blocks (or M best MRS-A resources).

The 24th DL measurement method may be applied in combination with other proposed methods of the present invention unless there is conflict therebetween.

3.1.25. 25th DL Measurement Method

The eNB may transmit a DL measurement RS for which a sequence and/or an antenna port resource is defined for each of a plurality of (analog) beams (hereinafter, MRS-B) a configured time and frequency resource region (through a preset scheme, a higher-layer signal, or system information) and the UE may use the MRS-B for the purpose of performing beam-level RRM in an RRC-connected mode.

Herein, a beam-level RRM value may mean a DL measurement value (or RRM value) defined per (analog) beam.

The MRS-B may have one or more of the following features.

- The MRS-B may be transmitted in the same time interval as a time interval in which an SS block is transmitted or in a different time interval from the time interval in which the SS block is transmitted (according to eNB configuration).
- When the MRS-B is transmitted in the same time interval as a time interval in which an SS block is transmitted, the MRS-B may be transmitted on a frequency resource which is not included in the SS block on the frequency axis.
- The UE may assume that antenna ports of the MRS-B have different analog beams.
- Upon comparing the MRS-B with the MRS-A (or synchronization signal of the above-described 24th DL measurement method), the UE may assume that beams having relatively small coverage and/or different analog beams are applied to the MRS.
- The UE may use all or a part of the MRS-B for CSI measurement.

Figure 22:
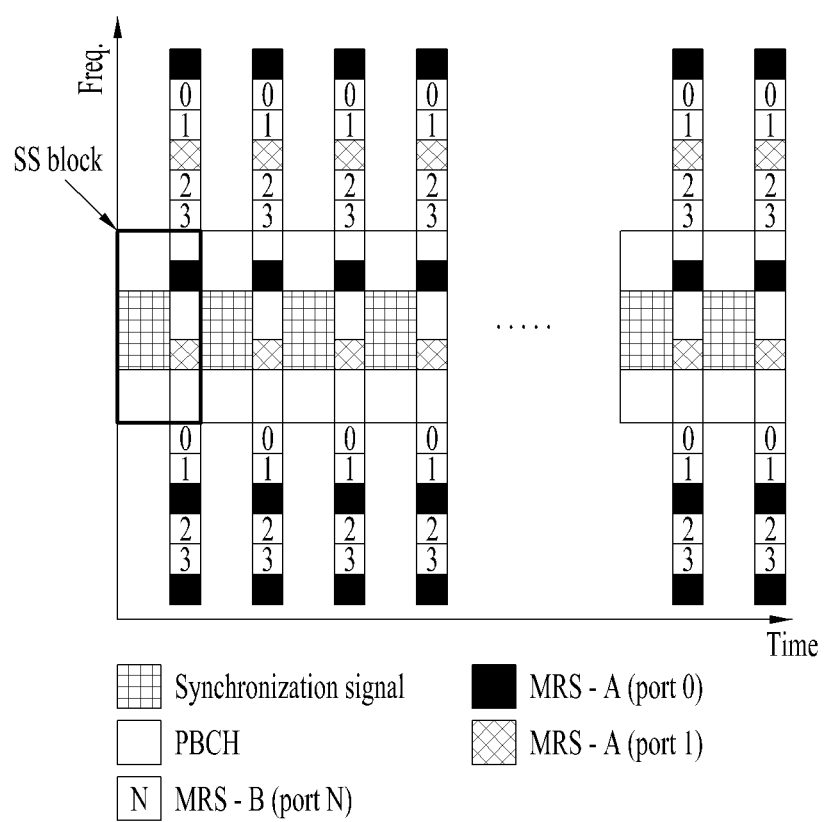
FIG. 22 is a diagram illustrating a configuration in which a 4-port MRS-B resource is transmitted in an outer region of a synchronization signal block in the same time interval of the synchronization signal block.

FIG. 22 is a diagram illustrating a configuration in which a 4-port MRS-B resource is transmitted in an outer region of an SS block in the same time interval of the SS block.

As illustrated in FIG. 22, the MRS-B may be transmitted by being FDMed with the MRS-A. In this case, as in a scheme of sharing RS patterns between the C-MRS and the B-MRS in the above-described 12th DL measurement method, the MRS-A and the MRS-B may share RS patterns. For example, the MRS-A and the MRS-B may multiplex N (=$N_1$+$N_2$) RS patterns which are FDMed into $N_1$ RS patterns and $N_2$ RS patterns, respectively.

Figure 23:
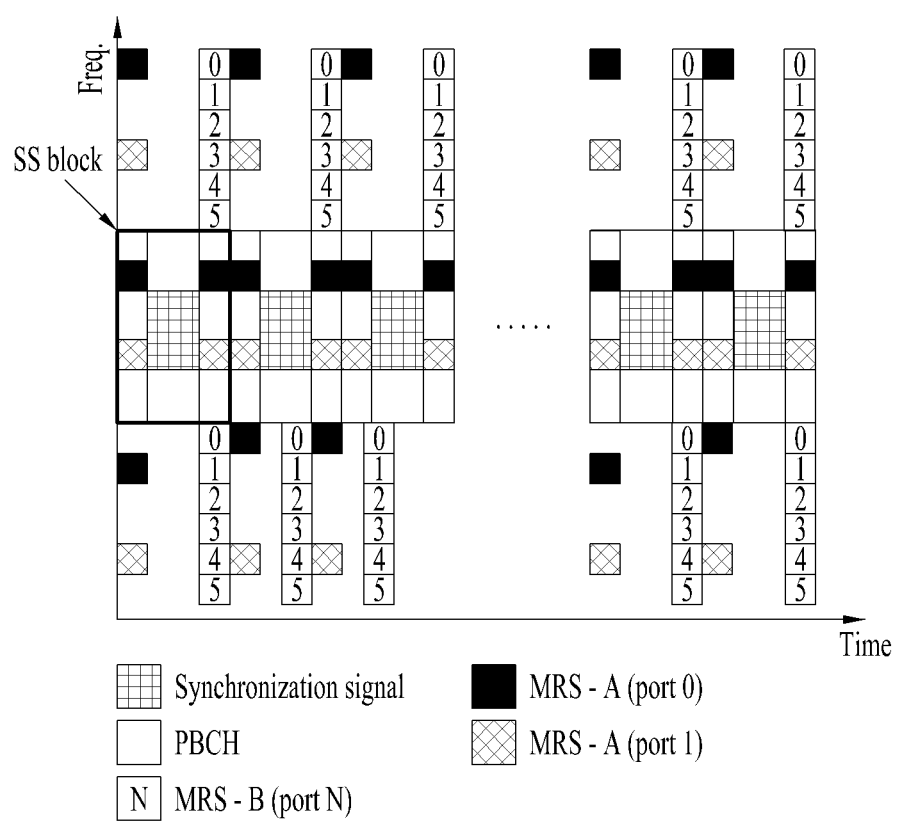
FIG. 23 is a diagram illustrating a configuration in which an MRS-A and an MRS-B are allocated in consideration of a PBCH repeated on the time axis in a synchronization signal block according to the present invention.

FIG. 23 is a diagram illustrating a configuration in which an MRS-A and an MRS-B are allocated in consideration of a PBCH repeated on the time axis in an SS block according to the present invention.

As an additional embodiment of the above-described 24th DL measurement method and 25th DL measurement method, the MRS-A and the MRS-B may be allocated as illustrated in FIG. 23.

For example, the MRS-A used for a PBCH DM-RS may be transmitted within a PBCH transmission frequency band. The MRS-A may be transmitted at the first (or second) PBCH transmission timing (or transmission symbol) on a frequency resource outside an SS block (according to configuration of the eNB). Next, the MRS-B may be transmitted at the second (or first) PBCH transmission timing (or transmission symbol) on a frequency resource outside the SS block (according to configuration of the eNB). In this case, the RS patterns between the MRS-A and the MRS-B need not to be shared and the MRS-A and the MRS-B may have independent RS patterns. For example, the MRS-B may conform to an RS pattern of a CSI-RS for CSI measurement.

Additionally, the MRS-A and the MRS-B may be allocated as follows in consideration of a PBCH repeated on the time axis in the SS block.

First, the MRS-A may always be transmitted together with a PBCH DM-RS within a PBCH transmission frequency band. Next, the MRS-A may be repeatedly transmitted at the first and second PBCH transmission timings (or transmission symbols) on a frequency resource outside the SS block (according to configuration of the eNB) and an OCC (e.g., [+1 +1]) may be applied to the MRS-A.

Similarly, the MRS-B may be repeatedly transmitted at the first and second PBCH transmission timings (or transmission symbols) on a frequency resource outside the SS block (according to configuration of the eNB) and an OCC (e.g., [−1 −1]) which is orthogonal to the OCC for the MRS-A may be applied to the MRS-B, so that the MRS-A is distinguished from the MRS-B.

When third-layer filtering (layer-3 filtering) (or time-axis filtering) is applied to a measurement value in every measurement interval when the UE performs RRM, the UE may reset an accumulated value as a serviced (analog) beam is changed and apply filtering again.

The following equation indicates a third-layer filtering method applied to a legacy LTE system and a third-layer filtering method applied in consideration of change of Tx and/or Rx (analog) beam direction in the NR system to which the present invention is applicable.

Existing Layer 3 Filtering Equation $$F_n = (1-\alpha)F_{n-1} + \alpha M_n \qquad \text{[Equation 2]}$$

$M_n$ is the latest received measurement result from the physical layer $F_n$ is the updated filtered measurement result, that is used for evaluation of reporting criteria or for measurement reporting $F_{n-1}$ is the old filtered measurement result, where $F_0$ is set to $M_1$ when the first measurement result from the physical layer is received $\alpha = \frac{1}{2}^{(k/4)}$, where k is the filterCoefficient for the corresponding measurement quantity received by the quantityConfig Changed Layer 3 Filtering Equation (Example)

Most simply, when Rx beams more than a range of N/M among N beams are changed, an old value is reset as follows.

$$F_n = (1-\alpha)F_{n-1} + \alpha M_n$$

$M_n$ is the latest received measurement result from the physical layer $F_n$ is the updated filtered measurement result, that is used for evaluation of reporting criteria or for measurement reporting $F_{n-1}$ is the old filtered measurement result, where $F_0$ is set to $M_1$ when the first measurement result from the physical layer is received $\alpha = \frac{1}{2}^{(k/4)}$, where k is if Rx analog beams of $M_{n-1}$ and $M_n$ are changed by N/M or more, 0 where M is a predefined value according to N or a value configured through RRC otherwise, the filterCoefficient for the corresponding measurement quantity received by the quantityConfig Herein, the meaning of "Tx and/or Rx analog beams are changed by N/M or more" may imply that an angle or received power of the corresponding beam is changed by N/M or more.

The 25th DL measurement method may be applied in combination with other proposed methods of the present invention unless there is conflict therebetween.

3.2 Initial Access Method Associated with DL Measurement 3.2.1. Initial Access Method Associated with First DL Measurement When the eNB supports MRS transmission, the UE may select a cell based on a DL measurement value for the synchronization signal and select a transmission resource for initial access using a DL measurement value for an MRS in the selected cell.

In this case, information about an MRS transmission resource (i.e., a sequence, time and frequency resources, and/or numerology) may be transmitted in system information about which the UE should detect for initial access.

More specifically, if the UE performs DL measurement (for cell selection) based on the synchronization signal transmitted using a single resource and sequence in a specific cell, the UE may perform an initial access procedure performed after cell selection may also be performed with respect to a single cell.

In the NR system to which the present invention is applicable, one cell may include a plurality of TRPs and, in most cases, it may be expected that actual data for a specific UE will be serviced (or provided) by one TRP.

It is desirable to perform an initial access procedure of the UE with respect to each TRP in terms of increase in the capacity of resources for initial access. Therefore, the eNB may support MRS transmission so that the UE may select a target TRP for initial access.

However, if the UE performs DL measurement (for cell selection) based on the MRS, this requires high measurement complexity of the UE and the UE may still perform DL measurement (for cell selection) based on the synchronization signal and use the MRS only to select a target TRP for initial access (or a transmission resource for corresponding initial access).

Figure 24:
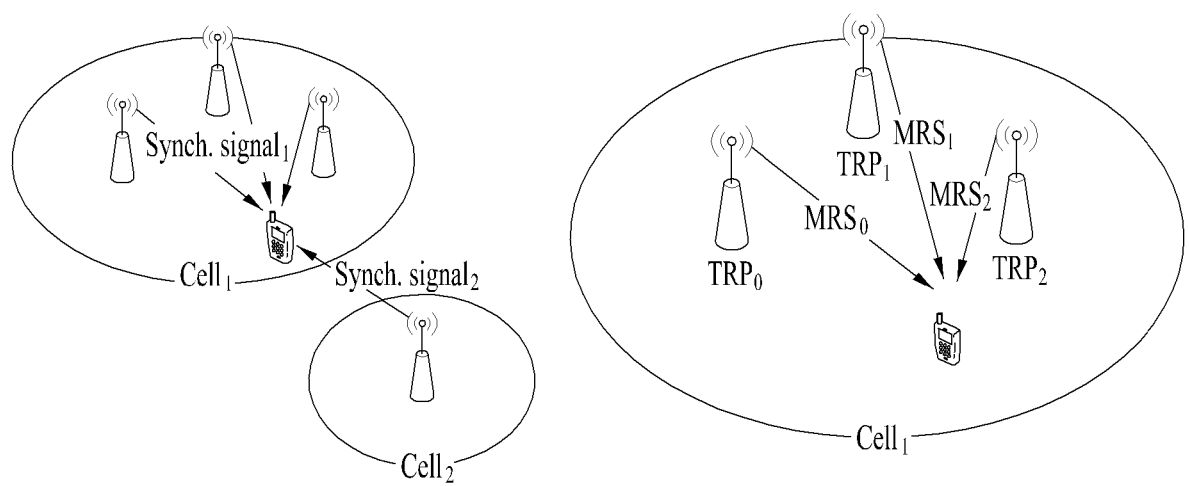
FIG. 24 is a diagram illustrating a configuration in which a UE uses a synchronization signal for DL measurement to select a cell and a configuration in which the UE uses an MRS for DL measurement to selecting a TRP/beam.

FIG. 24 is a diagram illustrating a configuration in which a UE uses a synchronization signal for DL measurement to select a cell and a configuration in which the UE uses an MRS for DL measurement to select a TRP/beam.

As illustrated in the left side of FIG. 24, the UE may perform DL measurement (for cell selection) based on the synchronization signal transmitted using an SFN. Alternatively, as illustrated in the right side of FIG. 24, the UE may perform DL measurement (for selecting the TRP/beam) for initial access based on the MRS for each TRP in a selected cell.

The initial access method associated with first DL measurement may be applied in combination with other proposed methods of the present invention unless there is conflict therebetween.

3.2.2. Initial Access Method Associated with Second DL Measurement

When the eNB supports MRS transmission and the UE transmits a preamble (for random access) in an initial access procedure (or an RACH procedure) after selecting a cell, the preamble resource (i.e., a sequence and/or time and frequency resources) may be determined using one of the following methods.

(1) The UE may transmit the preamble by selecting one resource in a preamble resource set corresponding to a combination having a maximum value among received power values of MRSs with respect to combinations of (most recently measured) {sequence, symbol, antenna port}.

(2) The UE may transmit the preamble by selecting one resource in a preamble resource set corresponding to a combination having most maximum values among received power values of the MRSs with respect to combinations of {sequence, symbol, antenna port} (in a most recently predetermined time interval).

(3) The UE may transmit the preamble by selecting one resource in a preamble resource set corresponding to a combination having a maximum value among added received power values of the MRSs for antenna ports with respect to combinations of (most recently measured) {sequence, symbol}.

(4) The UE may transmit the preamble by selecting one resource in a preamble resource set corresponding to a combination having most maximum values among added received power values of the MRSs for antenna ports with respect to combinations of {sequence, symbol} (in a most recently predetermined time interval).

(5) The UE may transmit the preamble by selecting one resource in a preamble resource set corresponding to a combination of {sequence, symbol, antenna port} (or a combination of {sequence, symbol}) of the MRS used for DL measurement corresponding to (3) (or (4) of the above-described third DL measurement method.

(6) The UE may transmit the preamble by selecting one resource in a preamble resource set corresponding to an MRS sequence used for DL measurement corresponding to (5) (or (6)) of the above-described third DL measurement method.

The eNB may inform the UE of information about a preamble resource set corresponding to each combination of {sequence, symbol, antenna port} of the MRS through system information.

More specifically, as a method of increasing capacity of resources for initial access, the UE may perform initial access for a specific TRP in a cell. In this case, the UE may use an MRS based DL measurement value transmitted by the eNB to select a cell for initial access.

Accordingly, the present invention proposes a method of determining an initial access resource (or a preamble transmission resource transmitted during initial access) as methods corresponding to (1) to (6) of the initial access method associated with the second DL measurement using the MRS.

Herein, an operation corresponding to (1) (or (3)) may indicate an operation of determining a preamble resource corresponding to a single beam that has measured the highest received power most lately (or a set of plural beams which can be simultaneously transmitted in a single TRP) and an operation corresponding to (2) (or (4)) may indicate an operation of determining a preamble resource corresponding to a single beam which has measured most frequently (or a set of plural beams which can be simultaneously transmitted in a single TRP) as a beam having the highest received power in a recent predetermined time interval (or a set of plural beams which can be simultaneously transmitted in a single TRP). An operation corresponding to (5) or (6) may indicate an operation of determining a preamble resource corresponding to a combination of {sequence, symbol, antenna port} of the MRS (or an MRS sequence) corresponding to MRS based DL measurement (for cell selection or TRP/beam selection).

As an additional example, if the eNB transmits a synchronization signal (according to a beam sweeping operation) on a plurality of orthogonal resources (or in symbols or time units) and the UE transmits a preamble (for random access) in an initial access procedure (or an RACH procedure) after selecting a cell, the UE may select the preamble resource (i.e., a sequence and/or time and frequency resources) in a preamble resource set corresponding to an orthogonal resource having a highest RRM value among the plural orthogonal resources (or symbols or time units) in which the synchronization signal is transmitted. The eNB may inform the UE of information about the preamble resource set corresponding to the plural orthogonal resources on which the synchronization signal is transmitted through system information.

More specifically, a cell may include a plurality of TRPs and the UE may perform DL measurement for cell selection based on the synchronization signal. If the plural TRPs in the cell transmits the synchronization signal by an SFN scheme, it is difficult to measure link quality when the UE actually receives data from each TRP. For example, if a cell including $TRP_1$ and $TRP_2$ transmits the synchronization signal according to the SFN scheme and each TRP actually performs data transmission, the UE may excessively measure link quality of actual data transmission thereof from the synchronization signal.

Since the eNB should perform a beam sweeping operation for analog BF, the eNB should transmit the synchronization signal in a plurality of symbols according to the beam sweeping operation. The eNB may control a plurality of adjacent TRPs to transmit the synchronization signal on different symbol resources using a plurality of symbol resources on which the synchronization signal is transmitted. Then, the eNB causes the UE to receive only the synchronization signal (or perform DL measurement) from a specific TRP per symbol.

In this case, the UE may assume that a DL measurement value or an RRM value measured using the synchronization signal in each symbol corresponds to a specific TRP. An optimal TRP having the best RRM value may be represented by a specific symbol in which the synchronization signal is transmitted. Next, the UE may perform a TRP-specific initial access procedure (or RACH procedure) in association with the position of the specific symbol.

In other words, the UE may determine a preamble resource set associated with a symbol position having the best (synchronization signal based) RRM value and transmit the preamble by selecting a specific resource in a corresponding resource set. Through this operation, an initial access resource or an RACH resource per TRP is discerned according to a TRP so that the UE may obtain cell splitting gain for a UL transmission resource.

The initial access method associated with second DL measurement may be applied in combination with other proposed methods of the present invention unless there is conflict therebetween.

3.2.3. Initial Access Method Associated with Third DL Measurement

When the eNB supports (periodic) cell-specific (or TRP/beam-specific) MRS transmission, the eNB may (opportunistically) transmit a control signal using the MRS as a demodulation RS on a resource identical to or adjacent to a resource of the MRS. Then, the UE may detect the control signal using the MRS as the demodulation RS in a transmission region in which the control signal is transmitted.

The UE may detect the control signal related to a response of the eNB, a fallback operation, and/or broadcast information for initial access in the control signal transmission region based on the MRS.

More specifically, when the eNB supports (periodic) cell-specific (or TRP/beam-specific) MRS transmission, the MRS may be a resource used commonly for channel estimation by UEs in a corresponding cell (or TRP/beam). Using this characteristic, the eNB may use the MRS as a demodulation RS for the UE-common control signal transmission region.

That is, the MRS may have two usages of DL measurement and channel estimation (for the UE-common control signal transmission region). The eNB may limitedly (or opportunistically) transmit a UE-common control signal only when necessary without always transmitting the UL-common control signal at a timing at which the MRS is transmitted.

The third DL measurement method may be applied in combination with other proposed methods of the present invention unless there is conflict therebetween.

The initial access method associated with third DL measurement may be applied in combination with other proposed methods of the present invention unless there is conflict therebetween.

3.2.4. Initial Access Method Associated with Fourth DL Measurement

If the UE transmits a preamble (for random access) in an initial access procedure (or an RACH procedure) after selecting a cell, the UE may determine a scrambling ID using one of the following methods.

(1) A scrambling ID corresponding to a RACH preamble resource (e.g., a sequence and a time/frequency resource)

(2) A scrambling ID corresponding to a DL transmission beam that the UE reports in the random access procedure In this case, the scrambling ID may be used to scramble a control channel, a data channel, or an RS in at least one or more of the following transmission procedures.

RAR

Msg. 3 (e.g., RRC connection request, RRC connection reconfiguration complete, etc.)

Msg. 4 (e.g., contention resolution identity—collision or non-collision)

DL/UL transmission (e.g., PDCCH, PDSCH, PUCCH, PUSCH, etc.) (of a step prior to RRC configuration for the scrambling ID)

The RACH procedure may have one of the following options.

1) Opt. 1: RACH preamble transmission→RAR reception→Msg. 3 transmission→Msg. 4 reception 2) Opt. 2: RACH preamble transmission and Msg. 3 transmission→RAR and Msg. 4 reception In the NR system to which the present invention is applicable, a cell may include a plurality of TRPs and/or beams. Desirably, cell splitting gain may be obtained by differently applying scrambling to the TRPs or beams which can be simultaneously transmitted (i.e., the same frequency resource may be reused by differently applying scrambling).

In this case, in at least an initial access procedure, the eNB cannot configure a serving beam for the UE. Then, the UE may first select a beam and the eNB may transmit a TRP-specific or beam-specific DL signal by applying scrambling corresponding to the beam.

To this end, the eNB should be aware of information about the beam selected by the UE and the UE may transmit the information about the selected beam to the eNB through the following two methods.

As a first method, the UE may select a beam prior to transmission of an RACH preamble resource and transmit an RACH preamble resource indicating the selected beam.

As a second method, the UE may also transmit information about a beam selected thereby during Msg. 3 transmission in an RACH procedure.

Then, the eNB may determine a scrambling ID based on the beam information reported by the UE and apply the scrambling ID for data transmission and reception in a subsequent RACH procedure and an initial access procedure.

[Proposed Method #18] may be applied in combination with other proposed methods of the present invention unless there is conflict therebetween.

The initial access method associated with fourth DL measurement may be applied in combination with other proposed methods of the present invention unless there is conflict therebetween.

3.2.5. Initial Access Method Associated with Fifth DL Measurement

If the UE selects an RACH preamble resource based on a DL measurement value in a random access procedure, the eNB may inform the UE of which DL RS (or DL signal) will be used to calculate a DL measurement value for selecting the RACH preamble resource of the UE through RACH configuration including configuration information for the RACH procedure.

Herein, the RACH configuration may be transmitted through system information.

More specifically, the eNB may operate only a single beam in a band below 6 GHz. Then, the UE will not use a beam-specific DL signal and may perform DL measurement for selecting the RACH preamble resource using a cell-specific DL signal.

The eNB may operate multiple beams in a band above 6 GHz. Then, the beam-specific DL signal may be present in addition to the cell-specific DL signal. When necessary, the eNB may increase the number of RACH preamble resources supported in an RACH procedure by configuring an independent RACH preamble resource set per beam. In this case, the UE may perform DL measurement for selecting the RACH preamble resource using the beam-specific DL signal.

If the DL signal used to perform DL measurement for selecting the RACH preamble resource is changed as described above, the eNB may transmit information about the DL signal to the UE through RACH configuration.

The initial access method associated with fifth DL measurement may be applied in combination with other proposed methods of the present invention unless there is conflict therebetween.

3.3. UL Measurement Method

3.3.1. First UL Measurement Method

The eNB may inform the UE of whether UL measurement (for cell selection) for a specific cell is performed or UL measurement (for TRP/beam selection in a cell) is performed through one of the following methods.

(1) The eNB may indicate whether UL measurement is performed to the UE through system information (e.g., an SIB).

In this case, the system information may include information about a target resource on which UL measurement in a cell is performed.

(2) If a period of a specific DL RS for a specific cell (or TRP/beam) is above a predetermined time period, the UE may assume that UL measurement in the cell is supported.

The specific DL RS may be a DRS (a signal for cell discovery) or an RS for DL measurement (e.g., a synchronization signal or MRS).

(3) The eNB may configure a UL measurement target cell and/or frequency band information for the UE through a higher-layer signal.

Herein, the UL measurement target cell may be restricted such that the UL measurement target cell is configured only when the UL measurement target cell corresponds to an SCell.

(4) The UE may assume that UL based measurement is performed for a cell known as a dormant cell.

Herein, the dormant cell means a cell in a dormant state in which only minimum DL signal transmission is performed to reduce consumed power or DL signal transmission is not performed.

The UE may perform UL RS transmission for UL measurement only with respect to a cell in which UL measurement can be performed.

More specifically, if the number of TRPs in a cell is excessively large, DL measurement (for TRP/beam selection in a cell) of the UE may require increased complexity. As a method of solving this problem, unlike the above-described DL measurement method, a configuration in which the UE transmits a UL RS for UL measurement and the eNB measures link quality of each TRP by performing UL RS based UL measurement.

However, if the number of TRPs in a cell is not larger or the number of UEs is large, UL RS transmission for UL measurement of the UE may increase power consumption of the UE and cause interference within the network. Therefore, according to an exemplary embodiment applicable to the present invention, if the number of TRPs in the cell is less than a predetermined number N, DL measurement may be performed and, if the number of TRPs is above the predetermined number N, UL measurement may be performed.

For the above operation, the eNB may inform the UE of whether DL measurement is performed or UL measurement is performed for a corresponding cell. For example, the eNB may inform the UE of whether UL measurement (for cell selection or for TRP/beam selection in a cell) for a corresponding cell through (broadcast) system information. Alternatively, if a transmission period of a specific DL RS (e.g., a DL RS for DL measurement) within the eNB is above a predetermined time period, the UE may recognize that DL measurement is not sufficient and transmit a UL measurement RS for UL measurement. Alternatively, if the UE receives configuration information from the eNB, the eNB may configure a UL measurement target cell (for TRP/beam selection) and/or frequency band information for the UE.

The first UL measurement method may be applied in combination with other proposed methods of the present invention unless there is conflict therebetween.

3.3.2. Second UL Measurement Method

If the eNB indicates UL RS transmission for UL measurement (for cell selection or TRP/beam selection) to the UE through a triggering signal, the eNB may indicate a UL RS for UL measurement of a specific carrier (which is different from a carrier in which the triggering signal is transmitted) as the triggering signal.

For example, the UL RS for UL measurement may be a preamble signal for random access.

More specifically, when the UE perform UL RS transmission for UL measurement (for cell selection or TRP/beam selection), the UE may transmit the UL RS on a UL resource preagreed with the eNB or transmit the UL RS under eNB transmission triggering.

In the latter case, if a plurality of carriers is configured for the UE, UL RS transmission triggering for UL measurement for a specific carrier may be indicated through a carrier different from the specific carrier. For example, when the UE does not maintain connection to carrier #1 while maintaining connection only to carrier #0, the eNB may indicate UL RS transmission for UL measurement for carrier #1 to the UE through carrier #0.

The second UL measurement method may be applied in combination with other proposed methods of the present invention unless there is conflict therebetween.

3.3.3. Third UL Measurement Method

If the eNB transmits a synchronization signal (according to a beam sweeping operation) on a plurality of orthogonal resources (or in symbols or time units) and the UE performs UL RS transmission for UL measurement using an event triggering scheme, the UE may transmit a UL RS for UL measurement upon occurrence of an event. Alternatively, the UE may perform an operation of acquiring UL RS related resource information for UL measurement and attempting to transmit the UL RS upon occurrence of the event. In this case, the event may imply that a synchronization signal having the highest DL measurement value is changed (e.g., change of the synchronization signal in terms of a sequence).

A DL measurement value for the synchronization signal may be one of the following values.

A maximum value among received power values of the synchronization signals measured with respect to a plurality of orthogonal resources in a latest synchronization signal transmission interval A DL measurement value measured according to the above-described first DL measurement method (herein, the time-axis filtering scheme is performed in a first layer or a second layer)

A DL measurement value measured according to the above-described first DL measurement method (herein, the time-axis filtering scheme is performed in a third layer)

If the UL RS for UL measurement is a preamble type for an RACH, a corresponding preamble resource may be selected by the initial access method associated with the above-described second DL measurement method.

The UL RS for UL measurement may be restricted such that the UE transmits the UL RS only once in a predetermined time interval (which is preset or configured by the eNB). In other words, the UE cannot transmit the UL RS in the predetermined time interval after transmitting the UL RS and may not perform UL RS resource information detection during this interval.

The above first layer, second layer, and third layer represent a physical layer (PHY), a MAC layer, and an RRC layer, respectively. If a first-layer filtering or second-layer filtering scheme is applied during calculation of the DL measurement value, the DL measurement value reflects a more recent channel state and, if a third-layer filtering scheme is applied, the DL measurement value reflects a more average channel state.

In the NR system to which the present invention is applicable, a method supporting mobility for UEs in a high-speed scenario in which, for example, passengers are present in a train moving at a high speed of about 500 km/h is under discussion. Supporting mobility means that the UEs moving at a high speed discern from which TRP or cell a service can be provided.

The UE may transmit the UL RS for the above purpose and the eNB or network may discern a network node (e.g., a TRP or cell) capable of providing a service to the UE based on a UL measurement value. In this case, since transmission of the UL RS by the UE at every moment is undesirable in terms of UE battery consumption and network interference, the UE may transmit the UL RS only when it is determined that the cell has been changed.

However, a DL measurement value which is used by the UE to determine that a cell has been changed to transmit the UL RS for UL measurement may be distinguished from a DL measurement value for cell selection by the UE (in a non-connected state).

To transmit the UL RS for UL measurement, the UE may consider the case in which a synchronization signal having a highest specific DL measurement value is changed as a triggering event. A specific DL measurement value for determining the event may be distinguished from a DL measurement value for cell selection by the UE (in a non-connected state).

For example, a DL measurement value for determining the event for UL RS transmission may be performed in the first or second layer and the DL measurement value for cell reselection may be performed in the third layer. The UE may transmit the UL RS for UL measurement and perform cell reselection only when the eNB responds to the UL RS. If the eNB does not respond to the UL RS although the UE has transmitted the UL RS, the UE may maintain a currently selected cell.

The third UL measurement method may be applied in combination with other proposed methods of the present invention unless there is conflict therebetween.

3.3.4. Fourth UL Measurement Method

If the UE transmits a UL RS for UL measurement to support mobility, the UE may determine a set of UL RS resources (a sequence or time and frequency resources) using one or more of the following information and select and transmit the UL RS in a corresponding UL RS resource set.

Information related to the UL RS resources within system information in a target cell to which the UL RS is to be transmitted A unique ID of the UE (assigned by the network)

Scheduling request (SR) information (i.e., presence/absence of UL traffic)

The UL RS may be a preamble for random access.

As described in the third UL measurement method, the UE may transmit the UL RS for UL measurement when an optimal synchronization signal is changed in terms of Rx sensitivity. Then, the UE should determine a UL RS resource which will be used to transmit the UL RS to a cell corresponding to the synchronization signal after the optimal synchronization signal is changed.

For example, the UE may acquire a UL RS resource set which can be used as the UL RS (for UL measurement) within system information indicated by the cell through a broadcast scheme and select and transmit a UL RS resource within the UL RS resource set. If many UEs for transmitting the UL RS for UL measurement are present, the UL RS resource set may divide UL RS resources at least on a UE group basis to prevent collision of the UL RS resources between UEs.

Accordingly, the present invention proposes a method of determining a UL RS transmission resource using both the information related to the UL RS resources within the system information in a target cell to which the UL RS is to be transmitted and the unique ID of the UE (assigned by the network) when the UE transmits the UL RS for UL measurement.

The fourth UL measurement method may be applied in combination with other proposed methods of the present invention unless there is conflict therebetween.

3.4. Additional Embodiments 3.4.1. First Additional Embodiment

When the UE determines radio link failure (RLF), the UE may perform cell-level RLF determination based on a cell-specific DL signal and beam-level RLF determination based on a beam-specific DL signal. The DL signals used to perform cell-level RLF determination or beam-level RLF determination may be as follows.

(1) Cell-level RLF
Synchronization signal
DM-RS of PBCH
C-MRS (2) Beam-level RLF
RS for CSI measurement (corresponding to serving beam) (i.e., CSI-RS)
B-MRS (corresponding to serving beam)

If the eNB configures a multi-beam based operation, the UE may perform beam-level RLF determination. That is, if the eNB configures a single-beam based operation, the UE may perform only cell-level RLF determination.

In a legacy LTE system, if the UE fails to decode a PDCCH in multiple SFs, the UE determines that out-of-synchronization has occurred. If the number of occurrences of out-of-synchronization exceeds a predetermined number (e.g., n310), the UE counts the number of occurrences of in-synchronization in a specific time interval (e.g., T310). Herein, in-synchronization implies that the UE succeeds in decoding the PDCCH in multiple SFs. If the number of occurrences of in-synchronization during T310 is less than n311, the UE determines that RLF has occurred. PDCCH decoding failure/success is determined by the UE through implementation with reference to received strength of a specific RS (e.g., low RSRP or low RSRQ→PDCCH decoding failure).

Even in the NR system to which the present invention is applicable, RLF for a cell, i.e., cell-level RLF, may be considered in a manner similar to the LTE system. The RS referenced by the UE may be a cell-specific DL signal. For example, the cell-specific DL signal may be a synchronization signal, a PBCH DM-RS, or a C-MRS.

In the NR system to which the present invention is applicable, a cell may include a plurality of TRPs or beams. In some cases, the UE may be unstably connected to a serving beam thereof although a state of the UE is not cell-level RLF. If beam-level RLF is additionally defined in the system and the UE is beam-level RLF, it may be desirable to support an operation of searching for the serving beam rather than searching for a cell again by additionally defining beam-level RLF.

To define beam-level RLF, the UE may use the beam-specific DL signal. For example, the beam-specific DL signal may be a CSI-RS or a B-MRS which has a QCL relationship with the serving beam.

Cell-level RLF may be defined by a beam search (or detection) operation which is performed after beam-level RLF determination. For example, cell-level RLF may be declared by time for performing beam detection.

More specifically, if the UE fails to detect a beam having received power higher than a predetermined level within a given time after beam-level RLF determination, the UE may declare cell-level RLF and perform an operation corresponding to cell-level RLF determination. The time (e.g., timer) for performing beam detection and a beam detection threshold value (e.g., beam-specific RS measurement value) may be predefined.

The first additional embodiment may be applied in combination with other proposed methods of the present invention unless there is conflict therebetween.

3.4.2. Second Additional Embodiment

Upon performing cell-level RLF determination and beam-level RLF determination, the UE (which is in an RRC-connected mode or a RAN-connected mode) may operate as follows according to RLF condition.
(1) Case in which cell-level RLF occurs
  1) The UE attempts to perform an RRC connection re-establishment procedure (i.e., higher-layer connection).
  2) If the UE succeeds in performing the RRC connection re-establishment procedure, the UE maintains RRC connection.
  3) If the UE fails to perform the RRC connection re-establishment procedure, the UE transitions to an RRC-idle mode and performs a cell selection/reselection procedure
(2) Case in which cell-level RLF does not occur
  1) Case in which beam-level RLF occurs
    1>> The UE attempts to perform a serving beam re-establishment procedure (i.e., serving beam connection).
    2>> If the UE succeeds in performing a serving beam re-establishment procedure, the UE maintains a serving beam.
    3>> If the UE fails to perform the serving beam re-establishment procedure, the UE initializes the serving beam and performs a beam recovery procedure.
  2) Case in which beam-level RLF does not occur
    1>> The UE maintains the serving beam until the eNB indicates serving beam release.
    2>> The UE maintains RRC connection until the eNB indicates RRC connection release.

The beam recovery procedure implies a series of processes in which (in a first layer and/or a second layer) the UE reports information about a best beam, which is preferred from the perspective of reception), or information about a channel of each beam to the eNB and the eNB configures a new serving beam based on reporting of the UE.

In the NR system to which the present invention is applicable, if the UE performs both cell-level RLF determination and beam-level RLF determination, the UE may first check whether RRC connection (or higher-layer connection) is disconnected based on cell-level RLF determination.

Specifically, if cell-level RLF occurs, the UE may first perform an RRC connection re-establishment procedure. If the UE fails to perform the procedure, the UE may determine that RRC connection is disconnected and transition to an RRC-idle mode. If cell-level RLF does not occur and beam-level RLF does not occur either, the UE determines that a physical-layer connection with the eNB is stable. If cell-level RLF does not occur but beam-level RLF occurs, the UE may first perform a serving beam re-establishment procedure. If the UE fails to perform the procedure, the UE may determine that a serving beam is unstable and perform a beam recovery procedure. The beam recovery procedure refers to a series of processes in which the UE reports information about a preferred beam from the perspective of reception or channel information of each beam to the eNB and the eNB reconfigures a serving beam based on reporting of the UE.

As another method, if beam-level RLF occurs, the UE checks whether cell-level RLF occurs by performing measurement for a cell-specific signal. If cell-level RLF is not declared, the UE may perform beam re-establishment or beam recovery. If cell-level RLF is declared in a procedure of checking cell-level RLF performed after beam-level RLF determination, the UE may perform an operation corresponding to cell-level RLF without an additional operation for beam-level RLF.

The second additional embodiment may be applied in combination with other proposed methods of the present invention unless there is conflict therebetween.

Figure 25:
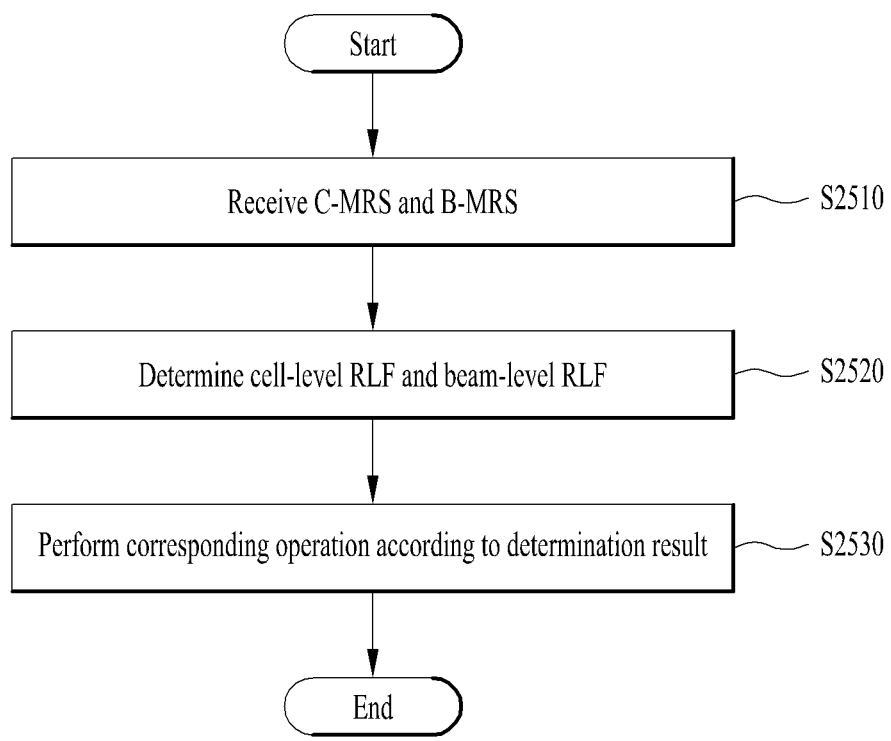
FIG. 25 is a flowchart illustrating an exemplary operation of a UE according to the present invention.

FIG. 25 is a flowchart illustrating an exemplary operation of a UE according to the present invention.

Prior to description of the operation of the UE according to the present invention, it is assumed in the NR system according to the present invention that the eNB connected to the UE operates a plurality of analog beams. Then, it is assumed that the UE configures one of the plural analog beams for the eNB as a serving beam.

The UE receives a cell-specific signal (e.g., a C-MRS) and a beam-specific signal (e.g., a B-MRS) which corresponds to the serving beam (S2510).

Herein, a synchronization signal, a DM-RS for a PBCH, and the like, defined in the NR system, may be applied as the C-MRS. A signal which corresponds to the eNB and is transmitted by applying a beam sweeping operation to the plural analog beams may be applied as the C-MRS.

An RS for channel state information measurement corresponding to the serving beam and a signal having a QCL relationship with the serving beam may be applied as the B-MRS.

Next, the UE determines cell-level RLF and beam-level RLF based on a result of receiving the C-MRS and the B-MRS (S2520).

Specifically, the UE may determine whether the cell-level RLF occurs based on received strength of the C-MRS and determine whether the beam-level RLF occurs based on received strength of the B-MRS. As measurement methods based on the respective signals, the various above-described DL measurement methods may be applied. Particularly, a measurement method for the C-MRS and a measurement method for the B-MRS may be independently determined.

For example, the UE may calculate an average value of higher N (where N is a natural number) measurement values for the C-MRS in each time interval, apply time-axis filtering to the average value in each time interval, and then determine whether the cell-level RLF occurs based on the value to which time-axis filtering is applied. In this case, time-axis filtering may include a median value filter or an exponential smoothing scheme.

Next, the UE performs a corresponding operation according to the determination result of step S2520 (S2530).

More specifically, upon determining that the cell-level RLF has occurred in step S2520, the UE may perform a radio resource control (RRC) connection re-establishment procedure.

If the RRC connection re-establishment procedure is successful, the UE maintains RRC connection with the eNB and, if the RRC connection re-establishment procedure fails, the UE may transition to an RRC-idle mode and perform a cell selection or cell reselection procedure.

In step S2520, upon determining that the cell-level RLF has not occurred and the beam-level RLF has occurred, the UE may perform a serving beam re-establishment procedure.

If the serving beam re-establishment procedure is successful, the UE may maintain RRC connection with the eNB using the serving beam and, if the serving beam re-establishment procedure fails, the UE may initialize the serving beam and perform a beam recovery procedure for the eNB.

Herein, the beam recovery procedure for the eNB may include transmitting information about a best beam preferred with respect to the eNB or information about a channel of each beam to the eNB; receiving configuration information regarding a new serving beam from the eNB based on the information transmitted to the eNB; and updating the serving beam for the UE using the configuration information regarding the new serving beam.

In step S2520, upon determining that the cell-level RLF has not occurred and the beam-level RLF has occurred, the UE may maintain the serving beam for the eNB until a serving beam release indication is received and maintain RRC connection with the eNB until an RRC connection release indication is received.

In this case, the UE may simultaneously perform the cell-level RLF and beam-level RLF determination operations or perform the beam-level RLF determination operation first and then perform the cell-level RLF determination operation. Alternatively, the UE may perform the cell-level RLF determination operation first and then perform the beam-level RLF determination operation. A detailed operation order of the UE may be differently determined according to embodiments.

Since examples of the above-described proposal method may also be included in one of implementation methods of the present invention, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

4. DEVICE CONFIGURATION

Figure 26:
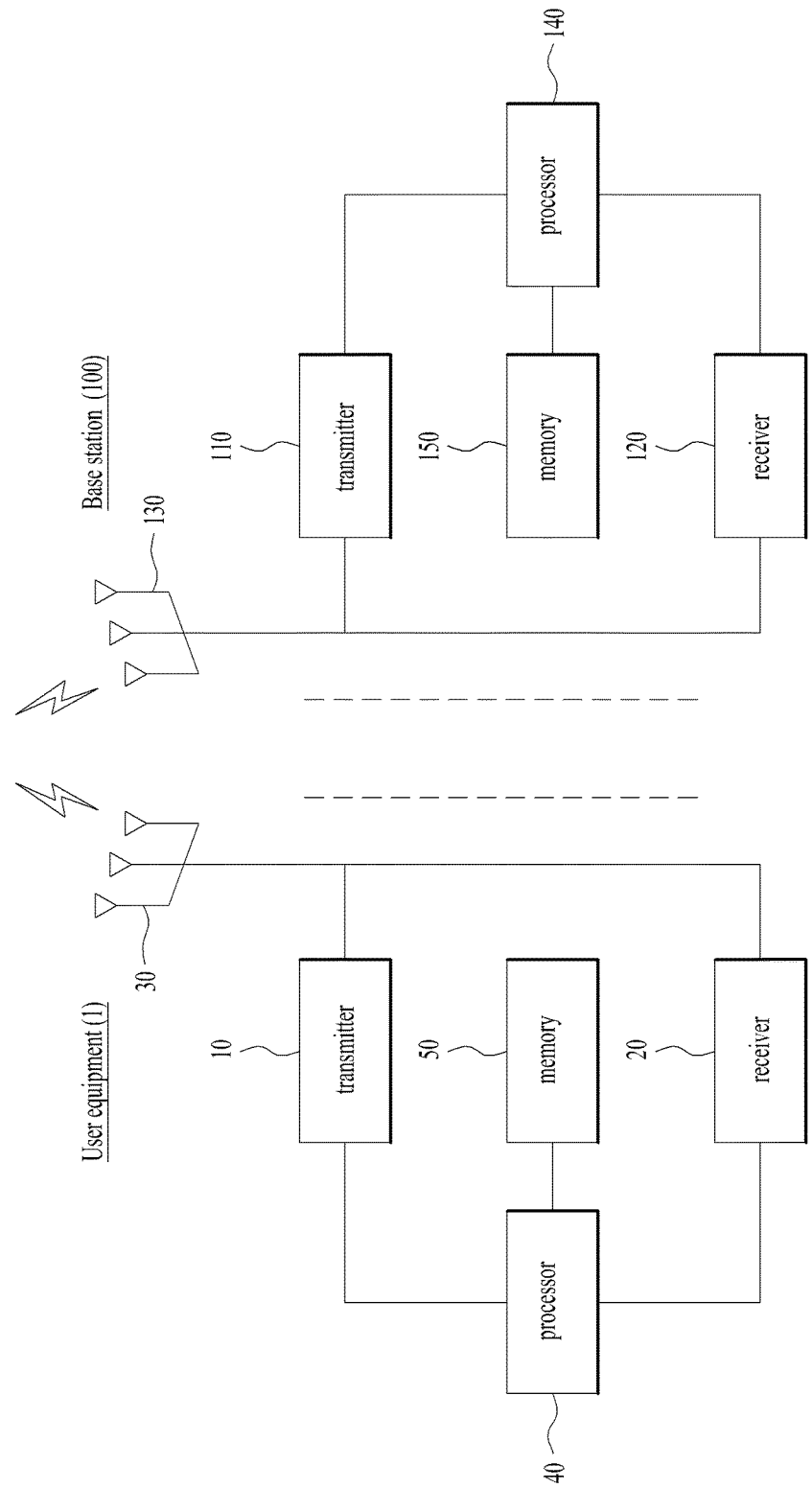
FIG. 26 is a diagram illustrating construction of a user equipment and an base station in which proposed embodiments can be implemented.

FIG. 26 is a diagram illustrating construction of a UE and an base station in which proposed embodiments can be implemented. The UE and the base station illustrated in FIG. 26 are implemented to perform the embodiments of the above-described operation method of the UE.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 constructed in this way may be connected to the eNB that operates a plurality of analog beams. Then, the UE may operate as follows.

More specifically, the UE 1 receives a cell-specific signal and a beam-specific signal, which corresponds to a serving beam of the eNB, from the eNB 100 via the receiver 20. The UE 1 determines the cell-level RLF and the beam-level RLF through the processor 40 based on the reception result of the cell-specific signal and the beam-specific signal. Next, the UE may perform a corresponding operation according to the determination result of the cell-level RLF and the beam-level RLF through the processor 40.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 26 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of operating by a user equipment (UE) connected to a base station (BS) operating a plurality of analog beams in a wireless communication system, the method comprising:
    receiving from the BS, a cell-specific signal and a beam-specific signal corresponding to a serving beam of the BS;
    determining cell-level radio link failure (RLF) and beam-level RLF, based on a result of receiving the cell-specific signal and the beam-specific signal; and
    performing a corresponding operation according to a result of determining the cell-level RLF and the beam-level RLF.

2. The method of claim 1, further comprising,
    performing a radio resource control (RRC) connection re-establishment procedure upon determining that the cell-level RLF has occurred.

3. The method of claim 2, further comprising:
    when the RRC connection re-establishment procedure is successful, maintaining RRC connection with an evolved Node B (eNB); and
    when the RRC connection re-establishment procedure fails, transitioning to an RRC-idle mode and performing a cell selection or cell reselection procedure.

4. The method of claim 1, further comprising
    performing a serving beam re-establishment procedure upon determining that the cell-level RLF has not occurred and the beam-level RLF has occurred.

5. The method of claim 4, further comprising:
    when the serving beam re-establishment procedure is successful, maintaining RRC connection with the BS using the serving beam; and
    when the serving beam re-establishment procedure fails, initializing the serving beam and performing a beam recovery procedure for the BS.

6. The method of claim 5, wherein the beam recovery procedure for the BS comprises:
    transmitting information about a best beam preferred with respect to the BS or information about a channel of each beam to the BS;
    receiving configuration information regarding a new serving beam from the BS based on the information transmitted to the BS; and
    updating the serving beam for the UE using the configuration information regarding the new serving beam.

7. The method of claim 1, further comprising:
    upon determining that the cell-level RLF has not occurred and the beam-level RLF has not occurred, maintaining the serving beam for the BS until a serving beam release indication is received and maintaining radio resource control (RRC) connection with the BS until an RRC connection release indication is received.

8. The method of claim 1, wherein the cell-specific signal includes at least one of:
    a synchronization signal,
    a demodulation reference signal (DM-RS) for a physical broadcast channel (PBCH), and
    a signal which corresponds to the BS and is transmitted by applying a beam sweeping operation to the plurality of analog beams.

9. The method of claim 1, wherein the beam-specific signal includes one or more of a reference signal for measuring channel state information corresponding to the serving beam and a signal having a quasi co-location (QCL) relationship with the serving beam.

10. The method of claim 1, wherein the cell-level RLF is determined based on received strength of the cell-specific signal.

11. The method of claim 10, further comprising:
    calculating an average value of higher N (where N is a natural number) measurement values for the cell-specific signal in each time interval; and
    determining the cell-level RLF based on a value obtained by applying time-axis filtering to the average value in each time interval.

12. The method of claim 1, wherein the beam-level RLF is determined based on received strength of the beam-specific signal.

13. A user equipment (UE) connected to a base station (BS) which operates a plurality of analog beams in a wireless communication system, the UE comprising:
    a transmitter;
    a receiver; and
    a processor connected to the transmitter and the receiver, wherein the processor is configured to:
    receive a cell-specific signal and a beam-specific signal corresponding to a serving beam of the BS, from the BS;
    determine cell-level radio link failure (RLF) and beam-level RLF, based on a result of receiving the cell-specific signal and the beam-specific signal; and
    perform a corresponding operation according to a result of determining the cell-level RLF and the beam-level RLF.

* * * * *